United States Patent
Fujiwara et al.

(10) Patent No.: US 8,039,153 B2
(45) Date of Patent: Oct. 18, 2011

(54) STORAGE BATTERY HAVING EXPANDED GRID MEMBER

(75) Inventors: Yoshiomi Fujiwara, Kyoto (JP); Hiroyuki Tanaka, Kyoto (JP)

(73) Assignee: GS Yhasa International, Ltd., Kyoto (JP)

( * ) Notice: Subject to any disclaimer, the term of this patent is extended or adjusted under 35 U.S.C. 154(b) by 0 days.

(21) Appl. No.: 12/953,040

(22) Filed: Nov. 23, 2010

(65) Prior Publication Data
US 2011/0070502 A1   Mar. 24, 2011

Related U.S. Application Data

(60) Continuation of application No. 11/444,668, filed on Jun. 1, 2006, which is a division of application No. 10/301,143, filed on Nov. 21, 2002, now abandoned.

(30) Foreign Application Priority Data

Nov. 21, 2001  (JP) .................................. 2001-356178
Dec. 3, 2001  (JP) .................................. 2001-368448
Jan. 31, 2002  (JP) .................................. 2002-023730

(51) Int. Cl.
*H01M 4/74* (2006.01)
(52) U.S. Cl. ........................ 429/242; 429/241
(58) Field of Classification Search ........... 429/241–242
See application file for complete search history.

(56) References Cited

U.S. PATENT DOCUMENTS

| | | | |
|---|---|---|---|
| 2,064,324 A | 12/1936 | Schnaubelt | |
| 4,291,443 A | 9/1981 | Laurie et al. | |
| 5,093,971 A | 3/1992 | Hein | |
| 5,958,625 A * | 9/1999 | Rao ............................... | 429/241 |

FOREIGN PATENT DOCUMENTS

| | | |
|---|---|---|
| CA | 1106703 | 8/1981 |
| JP | 57-090873 | 6/1982 |
| JP | 60-010560 | 1/1985 |
| JP | 61-066864 | 4/1986 |
| JP | 1-204364 | 8/1989 |
| JP | 9-223502 | 8/1997 |
| JP | 2000-348734 | 12/2000 |
| JP | 2001-006687 | 1/2001 |

* cited by examiner

*Primary Examiner* — Tracy Dove
(74) *Attorney, Agent, or Firm* — Jordan and Hamburg LLP

(57) ABSTRACT

A storage battery is provided in which an expand grid is improved with respect to the widths of grid wires $1b$, the sectional areas of nodes $1e$, and the shapes of meshes $1c$, whereby the productivity of the expand grid can be enhanced and the life performance can be improved. As means for attaining the object, a storage battery in which an expand grid is used as a battery plate, the expand grid being a grid member which is formed by expanding a side portion of a collector frame portion $1a$ of a metal sheet 1 to connect a large number of grid wires $1b$ to one another in a net-like shape, is configured so that widths of grid wires $1b$ of a row which is directly connected to the collector frame portion $1a$ of the expand grid, and a lateral end row are larger than widths of grid wires $1b$ of at least one of intermediate rows.

3 Claims, 19 Drawing Sheets

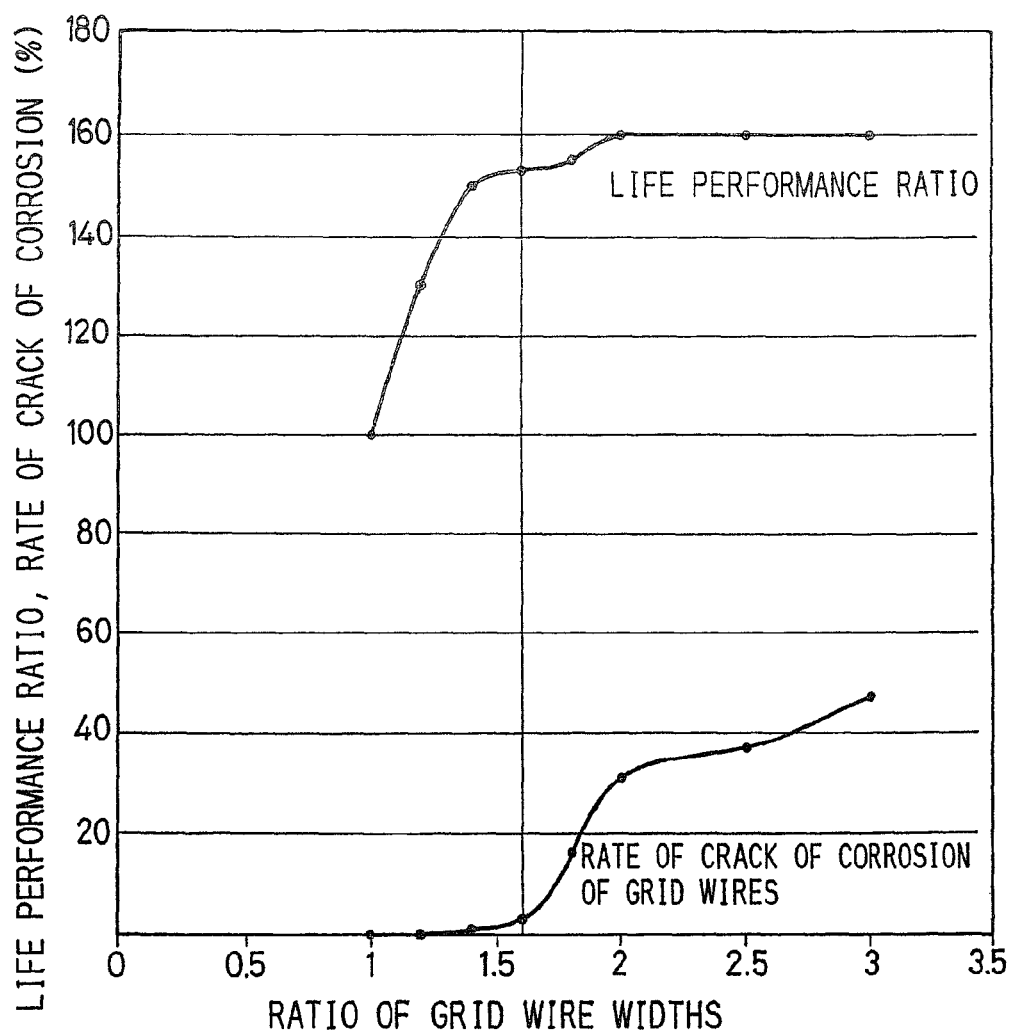

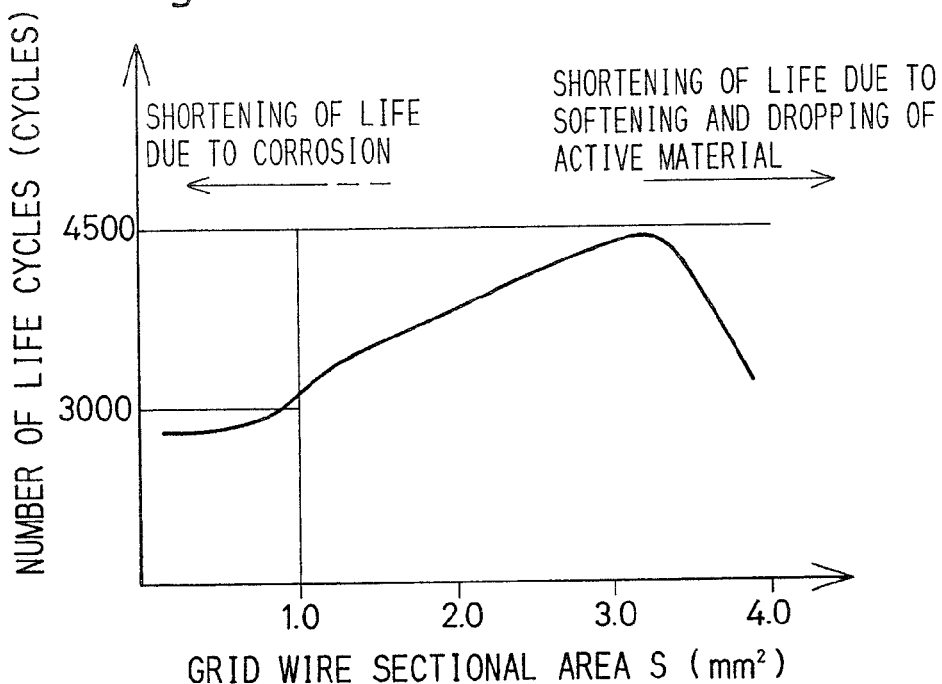
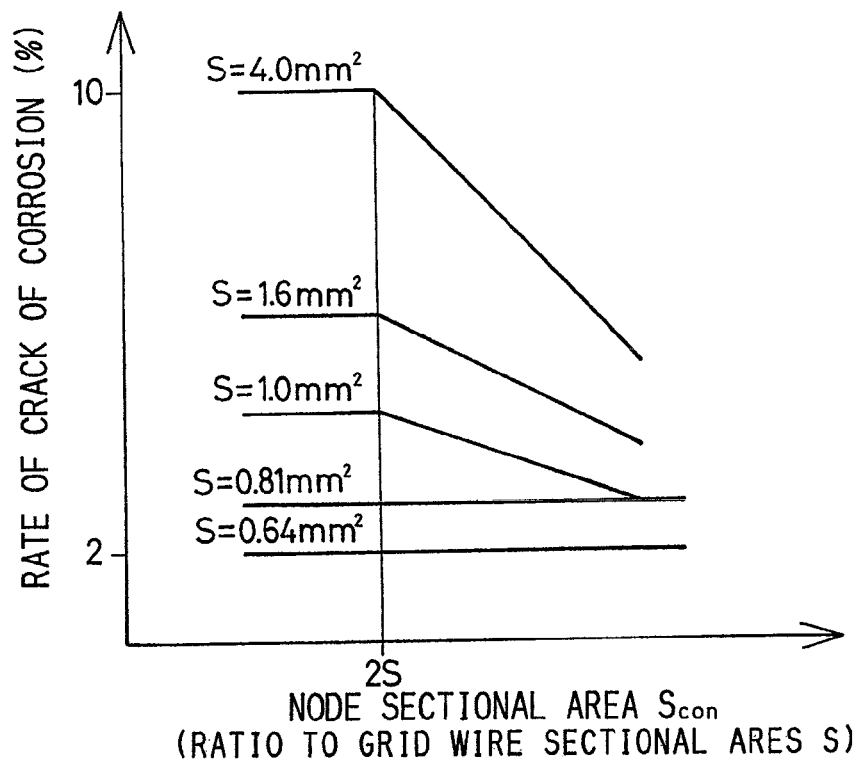

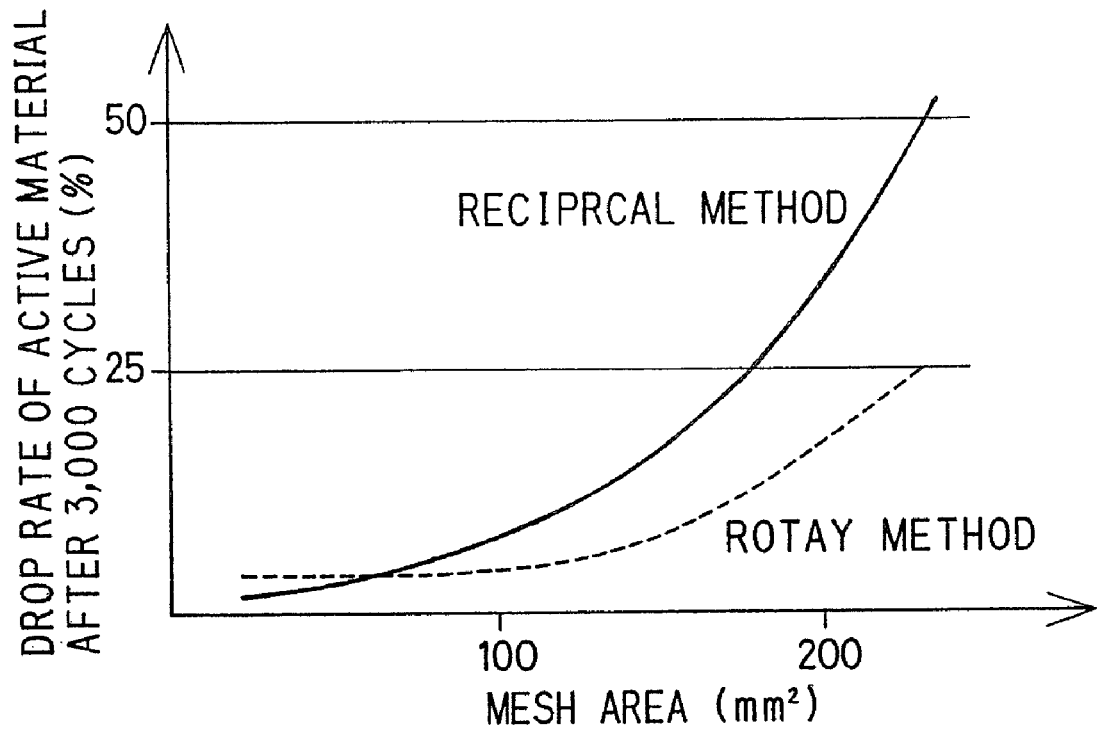

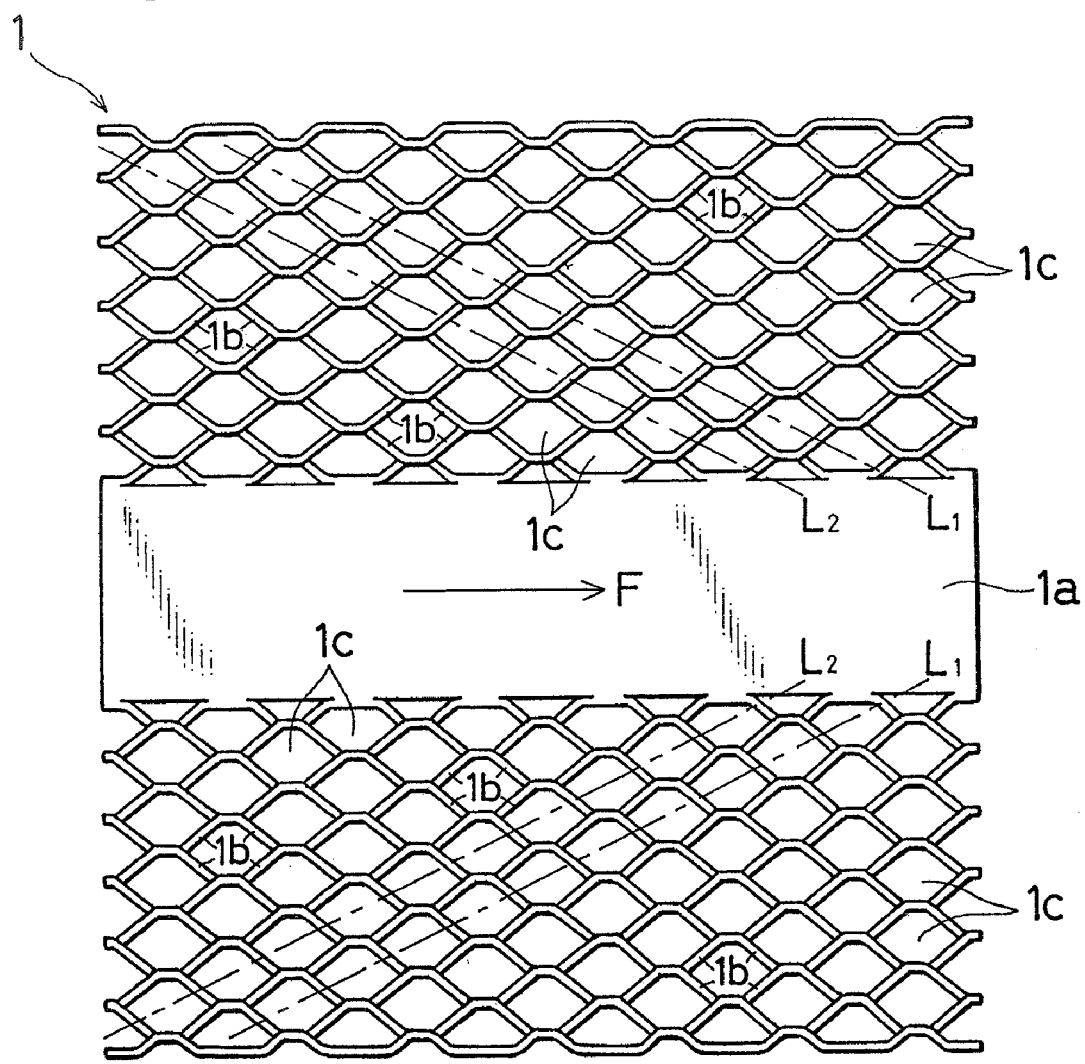

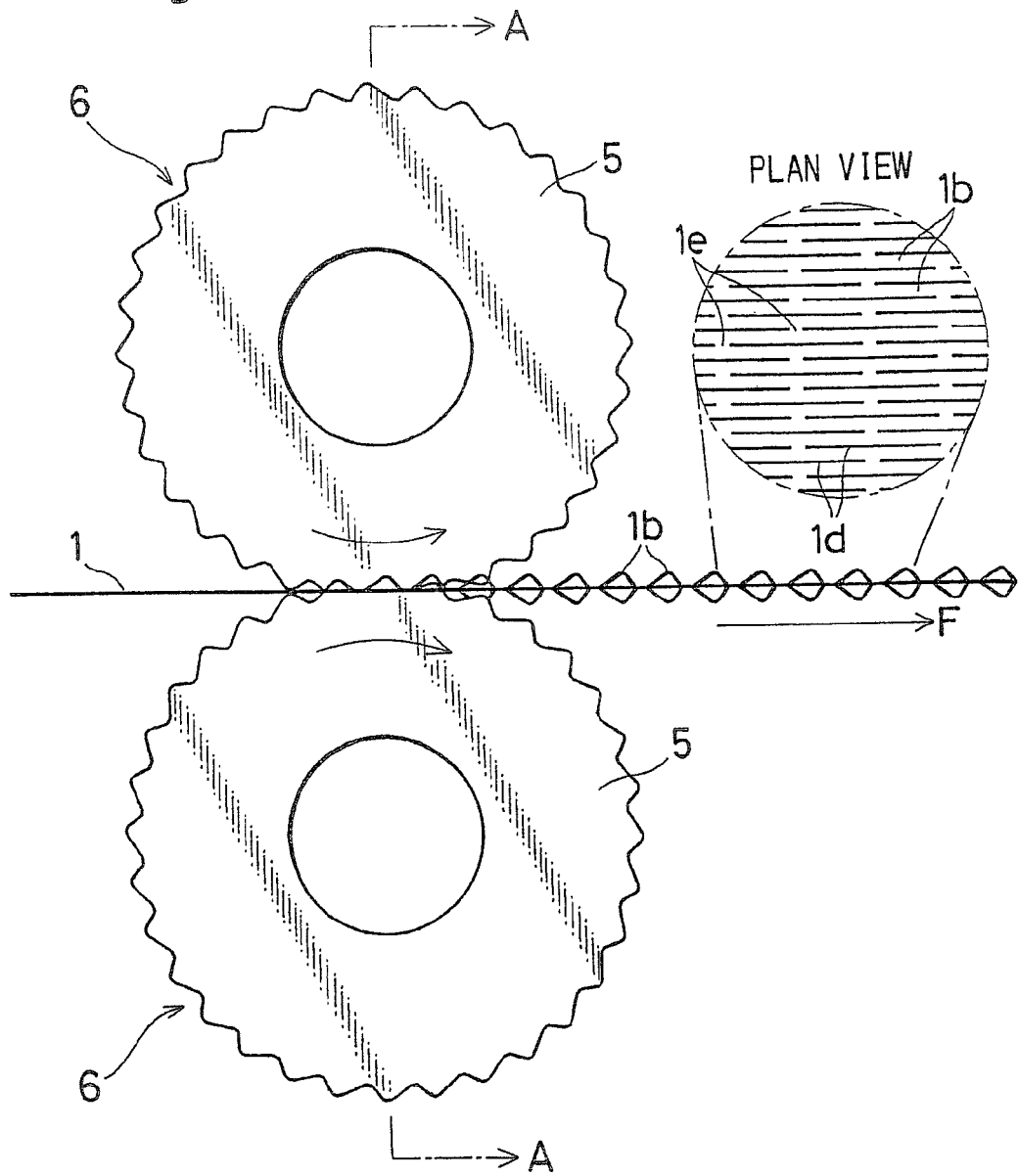

Fig.14(a) SIDE VIEW
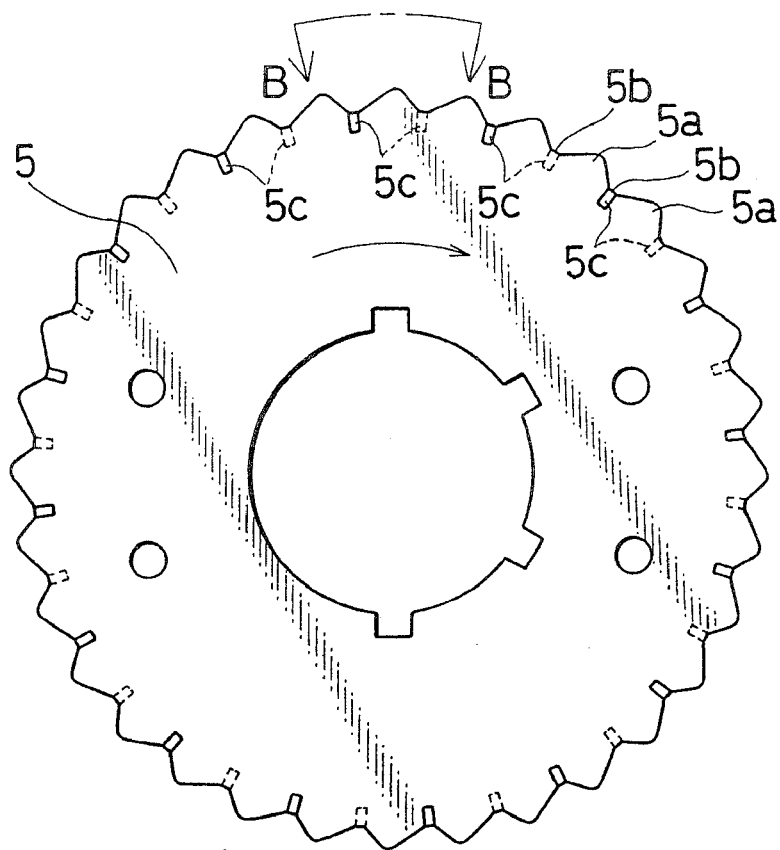
Fig.14(b) PLAN VIEW ALONG B-B
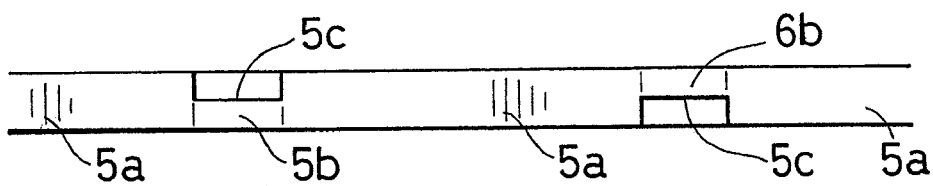
Fig.14(c) PARTIAL ENLARGED SIDE VIEW
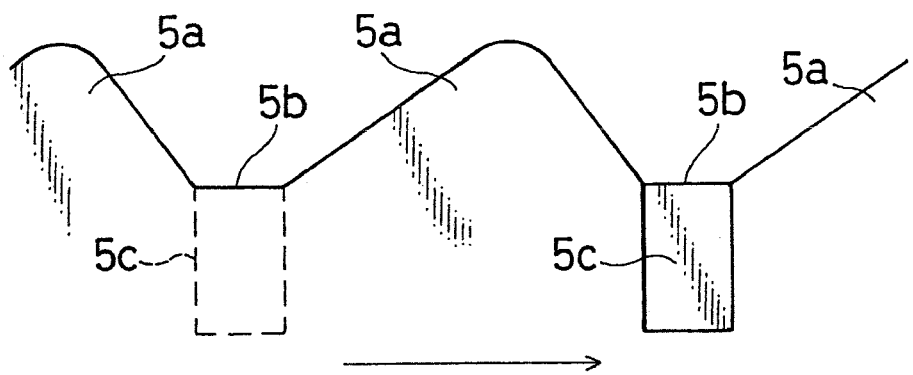

Fig.16 ( a ) SIDE VIEW
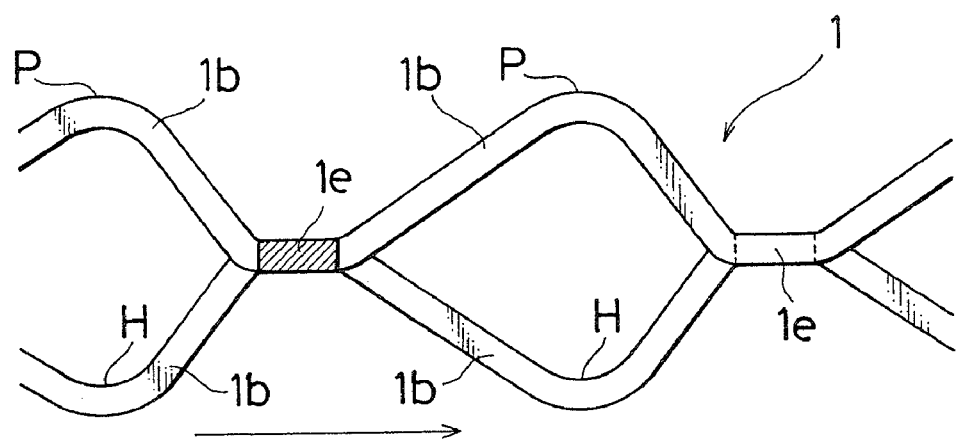
Fig.16 ( b ) PLAN VIEW
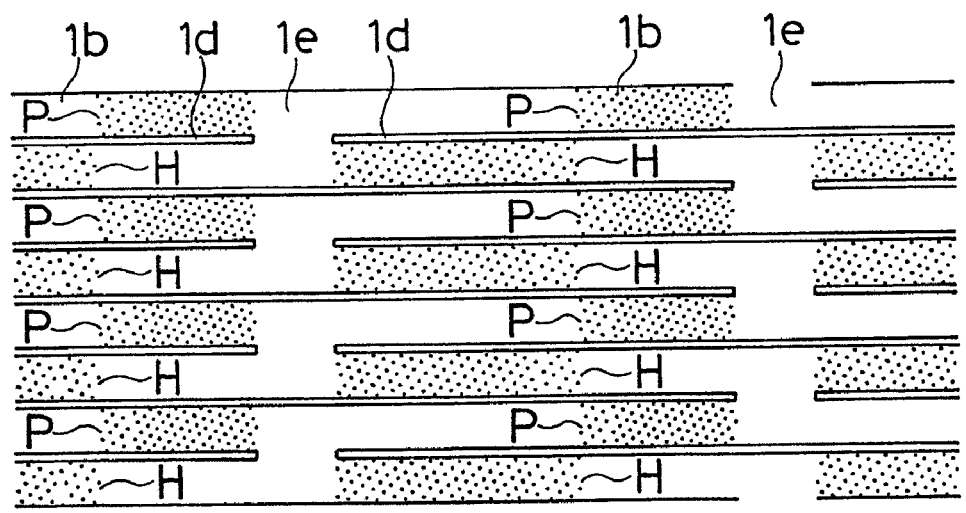

STORAGE BATTERY HAVING EXPANDED GRID MEMBER

REFERENCE TO RELATED APPLICATION

This is a continuation application of Ser. No. 11/444,668, filed Jun. 1, 2006, currently pending, which in turn is a divisional application of Ser. No. 10/301,143, filed Nov. 21, 2002, currently abandoned. The subject matter of the aforementioned prior applications is hereby incorporated herein by reference.

BACKGROUND OF THE INVENTION

The present invention relates to a storage battery in which an expand grid is used as a battery plate.

A grid which is to be used as a battery plate for a lead storage battery is sometimes produced by the expansion process. Methods of producing an expand grid by the expansion process are roughly classified into two kinds or the rotary method and the reciprocal method.

In the reciprocal method, an expand grid is produced in the following manner. Dice cutters which are arranged in a stepwise manner are vertically moved on a metal sheet that is intermittently moved, to sequentially form slits in the metal sheet, and the metal sheet is then stretched to be formed into a net-like shape. Specifically, as shown in FIG. 11, a metal sheet 1 made of lead or a lead alloy is intermittently transported on a flat upper face of a lower table 2 in the direction of the arrow F. Step-like side faces 2a are formed on the side faces of the lower table 2, respectively. In the step-like side faces 2a, a large number of steps (in the figure, only four steps are shown for the sake of simplicity) are formed in such a manner that the distance between the side faces is stepwise reduced toward the center by a constant step difference as advancing in the direction of the arrow F. An upper table 4 to which dice cutters 3 are attached is placed above the lower table 2. In practice, the upper table 4 is placed in a position which is lower in level than the illustrated position, or which is slightly above the metal sheet 1 transported on the lower table 2, and conducts vertical motions in the position. Step-like side faces 4a which are similar to the step-like side faces 2a of the lower table 2 are formed on the side faces of the upper table 4, respectively. The dice cutters 3 are fixed to the step-like side faces 4a of the upper table 4, respectively, with the result that the dice cutters are arranged in a substantially V-like shape as a whole. In each of the dice cutters 3, an edge 3a is downward projected from the lower face of the upper table 4.

Each time when the intermittent motion is stopped, the upper table 4 is lowered to conduct one cycle of the vertical motion, whereby the end portions of the metal sheet 1 are cut and downward stretched by the edges 3a of the dice cutters 3, resulting in that an expand grid such as shown in FIG. 12 is formed. Namely, the metal sheet 1 is processed into an expand grid in which the both side portions of a collector frame portion 1a in a center area in the width direction are sequentially stretched into grid wires 1b that are connected to one another in a net-like shape. The expand grid has a large number of meshes 1c in the form of meshes each surrounded by four grid wires 1b. The collector frame portion 1a is an area of the metal sheet 1 in which the meshes 1c are not formed in order to enable current collection in a battery plate, and a plate lug for future connection to a terminal is formed. The expand grid shown in FIG. 12 is produced by an apparatus in which, unlike that shown in FIG. 11, twelve dice cutters 3 are attached to each of the side faces of the upper table 4.

In the reciprocal production method, the operations of cutting the metal sheet 1 by the dice cutters 3, and stretching and expanding the grid wires 1b to form the meshes 1c are completed by one cycle of vertical motions of the upper table 4. Therefore, the reciprocal production method is conducted so that each of the meshes 1c is formed into a rhombic shape and the four grid wires 1b surrounding the mesh have the same length, thereby allowing stress in the process of stretching the grid wires 1b to be uniformly applied to the wires. As in the invention disclosed in Japanese Patent Publication (Kokai) No. SHO57-90873, another reciprocal production method is known in which each of the meshes 1c is formed into a substantial parallelogram shape so as to have long and short edges of different lengths. In the reciprocal production method, the grid wires 1b are stretched straight downward by the edges 3a of the dice cutters 3, and hence the grid wires 1b are not twisted during the expansion process. Therefore, the method has the advantage that the grid used as a battery plate of a storage battery exhibits an excellent life performance.

In the expand grid, the meshes 1c on an oblique line indicated by, for example, the one-dot chain line $L_1$ are formed at one stroke by the dice cutters 3 which are arranged in a substantially V-like shape. When the metal sheet 1 is transported by a predetermined distance as a result of intermittent motion and the upper table 4 conducts the next vertical motions, the meshes 1c on the oblique line indicated by the one-dot chain line $L_2$ are formed at one stroke. In the metal sheet 1, therefore, the meshes 1c in the lateral end portions in the width direction are first formed, and, each time when the intermittent motion is further advanced, inner meshes 1c are sequentially formed. The edges 3a of the dice cutters 3 press down two grid wires 1b which are arranged in a substantially V-like shape below the respective meshes 1c. The grid wires 1b which are pressed down by the same dice cutter 3 are arranged in one row along the advancing direction F while being alternately inclined in a zigzag manner.

In the thus produced expand grid, as shown in FIG. 12, the grid wires 1b are connected to one another in a net-like shape on both the sides of the collector frame portion 1a which is formed in the center area in the width direction of the metal sheet 1. When the expand grid is to be used as a battery plate, the collector frame portion 1a is divided into two portions along a cutting line which elongates in the direction of the arrow F. In the resulting expand grid which will be used as a battery plate, therefore, the grid wires 1b in a net-like shape are connected to one side of the collector frame portion 1a. In the reciprocal method of producing an expand grid, since the metal sheet 1 is intermittently transported, the rate of production is somewhat low.

In the rotary method, an expand grid is produced in the following manner. In a slit forming step, first, a large number of zigzag slits are formed in a metal sheet by using a disk cutter. In an expanding step, then, the metal sheet is expanded in the width direction to stretch the slits into a net-like shape. Namely, in the rotary production method, an expand grid is produced in the following manner. In the slit forming step shown in FIG. 13, first, the metal sheet 1 is passed between upper and lower disk cutter rolls 6 each of which is configured by a stack of a large number of disk cutters 5, thereby forming slits 1d. As shown in FIG. 14, each of the disk cutters 5 is a metal disk in which many ridges 5a and valleys 5b are alternately formed in the peripheral face. In peripheral edge portions of the front and rear faces of the disk cutter 5, grooves 5c are formed respectively for the valleys 5b so as to be opened in the corresponding valleys 5b. In each of the valleys 5b, however, the groove 5c is formed in only one of the front and rear faces, and, in the adjacent valleys 5b, the grooves 5c are formed in opposite ones of the front and rear faces, respectively. As shown in FIG. 15, each of the disk cutter rolls 6 is configured by stacking a large number of such disk cutters 5 on the same shaft via spacers 7. The upper and lower disk cutter rolls 6 are placed in positions where the disk cutters 5 are shifted in the axial direction by a half pitch, and the upper and lower peripheral edges are alternately engaged with each other. The upper and lower disk cutter rolls 6 are rotated in synchronization, in opposite directions, and in a phase relationship in which the ridges 5a and the valleys 5b of the upper and lower disk cutters 5 are overlapped and engaged with each other.

When the metal sheet 1 is passed between the disk cutter rolls 6, as shown in FIG. 13, a large number of slits 1d are formed by the disk cutters 5. In the valleys 5b of the upper and lower disk cutters 5 where the grooves 5c face each other, the slits 1d are intermitted, and hence are not continuous along the advancing direction F of the metal sheet 1 but formed with being intermitted at regular intervals. Moreover, the slits 1d which are formed adjacently in the width direction of the metal sheet 1 are shifted by a half pitch in the advancing direction F, and the slits are formed in a zigzag manner as a whole. The thin metal wire-like portions between the adjacent slits 1d are formed as grid wires 1b, and the intermittent portions of the slits 1d along the advancing direction F are formed as nodes 1e.

Since the grid wires 1b are pressed in the upward and downward directions when the slits 1d are formed by the ridges 5a of the upper and lower disk cutters 5, the grid wires 1b are elastically deformed so as to protrude in the upward and downward directions from the front and rear faces of the metal sheet 1 as shown in FIG. 16(a). All of a series of the grid wires 1b which are arranged via the nodes 1e along the advancing direction F are upward pressed by the ridges 5a of, for example, the lower disk cutter 5 as shown in FIG. 16(b), whereby the center areas are formed as upward protrusions P. All of the series of the grid wires 1b which are adjacent to the grid wires in the advancing direction F of the metal sheet 1 are downward pressed by the ridges 5a of the upper disk cutter 5, whereby the center areas are formed as downward protrusions P.

In the above-described rotary production method, the slits 1d are formed by passing the metal sheet 1 between the two upper and lower disk cutter rolls 6 which are vertically arranged. Alternatively, the slits 1d may be formed by passing the metal sheet 1 between three or more disk cutter rolls 6.

The metal sheet 1 in which the slits 1d are formed as described above is stretched to both the sides in the width direction to be expanded in an expanding step shown in FIG. 17, to be formed into an expand grid. In a usual expand grid which is produced by the rotary method, as shown in FIG. 18, the collector frame portion 1a is disposed in the center area in the width direction of the metal sheet 1, lower frame portions 1f are disposed in the lateral end portions, respectively, and the large number of meshes 1c in a net-like shape are formed between the collector frame portion 1a and the lower frame portions. In the collector frame portion 1a and the lower frame portions 1f, the meshes 1c of the metal sheet 1 are not formed. A plate lug which will be connected to a terminal for the purpose of current collection is formed on the collector frame portion 1a. Each of the lower frame portions 1f is a portion which will function as the lower end of a battery plate when the plate is placed in a battery case. As shown in FIG. 17, the metal sheet 1 is expanded by further laterally pulling the lower frame portions 1f in the lateral end portions by expanding apparatuses 8. The expanding apparatuses 8 are endless chain apparatuses which are placed so as to form a fan-like shape on respective sides of the transportation path of the metal sheet 1. Engagement portions attached to chain rollers are engaged with the lower frame portions 1f of the transported metal sheet 1, so that the metal sheet is stretched obliquely outward. Therefore, the metal sheet 1 is pulled toward the lateral end portions in the width direction, so that the gaps between the slits 1d are widened to be formed into the meshes 1c of a substantially rhombic shape and the four grid wires 1b which surround each of the meshes 1c and which have a substantially same length are connected to one another in a net-like shape, thereby producing an expand grid. The grid wires 1b which are formed by the series of adjacent slits 1d are in the same row, and arranged in a row along the advancing direction F while being alternately inclined in a zigzag manner.

When the thus produced expand grid is to be used as a battery plate, the collector frame portion 1a which is in the center area in the width direction is divided into two portions along a cutting line which elongates in the direction of the arrow F. In the resulting expand grid which will be used as a battery plate, therefore, the grid wires 1b in a net-like shape are connected to one lateral side of the collector frame portion 1a, and the lower frame portion 1f is in the lateral end portion of the grid.

In the rotary production method, the slit formation and the expansion are conducted while the metal sheet 1 is continuously transported. Therefore, the method has an advantage that the speed of producing an expand grid can be made larger than that in the reciprocal method. Unlike the case of the reciprocal method in which the cutting and expansion of the grid wires 1b are completed at one stroke, however, the grid wires 1b of the metal sheet 1 suffer two times high stress due to the slit forming step and the expanding step, because, in the slit forming step, the grid wires 1b are deformed in either of the upward and downward directions by the ridges 5a of the disk cutters 5, and, in the expanding step, are stretched in order to form the meshes 1c. In the expanding step, moreover, unlike the case of the reciprocal method in which the grid wires 1b are pressed only in the downward direction by the dice cutters 3, the grid wires 1b are stretched via the nodes 1e while being twisted. Therefore, also stress due to the twisting is applied to the expand grid. Consequently, an expand grid produced by the rotary method has a further disadvantage that the grid wires 1b are easily ruptured or cracked during the production process to lower the production yield and impair the life performance.

In both expand grids which are produced respectively by the reciprocal method and the rotary method, usually, the grid wires 1b have a uniform width in every portion. In the case where such an expand grid is used as a positive plate of a lead storage battery, however, an oxidation reaction of lead or a lead alloy occurs during a charging process, and the reaction proceeds to sometimes cause the grid wires 1b to be cracked by oxidation corrosion. When the grid wires 1b are cracked, an active material held in meshes 1c which are remoter from the collector frame portion 1a than the cracked portion is electrically isolated to be hardly charged and discharged. When the grid wires 1b in the vicinity of the collector frame portion 1a are cracked, therefore, a larger quantity of the active material are electrically isolated, with the result that the capacity of the battery plate is greatly reduced. To comply with this, conventionally, a countermeasure is sometimes taken in which the grid wires 1b of rows that are closer to the collector frame portion 1a are made larger in width. As described above, the influence due to a crack of corrosion is larger as the cracked row is closer to the collector frame portion. Namely, techniques such as described below have been proposed. In the invention disclosed in Japanese Utility Model Publication (Kokai) No. SHO61-66864, thicker grid wires are formed in a part of an expand grid. In the invention disclosed in Japanese Patent Publication (Kokai) No. HEI1-204364, the widths of grid wires of an expand grid are gradually reduced as proceeding from the upper side to the lower side. In the invention disclosed in Japanese Patent Publication (Kokai) No. HEI9-223502, the thickness of grid wires is defined.

In a positive plate of a lead storage battery for a communication field or the like in which a long life period is particularly requested, an expand grid is sometimes used in which the metal sheet 1 of a large thickness is used so as to thicken all the grid wires 1b, whereby the corrosion resistance is enhanced in order to prevent the grid wires 1b from being cracked by corrosion.

Problem (1) to be Solved by the Invention

In both expand grids produced by the rotary and reciprocal methods, when the expand grids are produced so that the grid wires 1b have different widths, grid wires 1b of a narrower width are easily cracked, thereby causing a problem in that the yield is lowered. This will be described more specifically. With respect to an expand grid produced by the rotary method, the production process includes the expanding step of stretching the metal sheet 1 in the width direction. When the widths of the grid wires 1b are varied depending on the position in the width direction of the metal sheet 1, i.e., the row, therefore, high stress in the expanding step is applied to a portion of each grid wire 1b in which the grid wire has a small width and hence is low in strength. Moreover, tensile stress produced during the step of stretching the metal sheet 1 is first applied to the grid wires 1b of the rows in the lateral end portions which are remotest from the collector frame portion 1a. When the widths of such grid wires 1b of the lateral end rows are smaller than or equal to those of the grid wires of the other rows, particularly, the grid wires are easily cracked. With respect to an expand grid produced by the reciprocal method, the meshes 1c are formed in the sequence from the lateral end portions of the metal sheet 1 which are remotest from the collector frame portion 1a in the center area of the metal sheet 1, to the inner side. When the grid wires 1b of a small width and low strength are placed in the lateral end portions, therefore, the grid wires 1b are easily cracked by vibrations due to the vertical motions of the upper table 4 or the intermittent motion of the metal sheet 1.

Problem (2) to be Solved by the Invention

The rotary production method has the advantages of a high speed of producing an expand grid and high productivity, but has a problem in that, when the metal sheet 1 is made thick in order to enhance the corrosion resistance, there arises the possibility that the nodes 1e are ruptured or cracked. Specifically, when the metal sheet 1 is thick, the sectional areas of the grid wires 1b are inevitably increased. Even when a soft metal such as lead or a lead alloy is used, therefore, the rigidity of the grid wires 1b is enhanced, so that, when the grid wires 1b are stretched in the expanding step, high tensile stress is applied to the nodes 1e. The tensile stress is higher as the sectional areas of the grid wires 1b are larger. In the rotary production method in which the grid wires 1b are stretched from both the sides in the expanding step to be expanded, the tensile stress applied to the nodes 1e is excessively high. When a thick metal sheet 1 is used, therefore, an expand grid is produced by the reciprocal method in most cases. In practice, a relatively thin metal sheet 1 is preferably used in the rotary production method. Therefore, the rotary production method is often employed in production of an expand grid to be used as a battery plate for a lead storage battery for an automobile, and is seldom employed in production of an expand grid in which a lead sheet having a thickness of 1.0 mm or more is used, or an expand grid in which the sectional areas of the grid wires 1b are 1.0 mm$^2$ or more.

When an expand grid in which a thick metal sheet 1 is used is produced by the reciprocal method, there arises a problem in that the active material in the battery plate easily drops off during usage. Specifically, when the metal sheet 1 is thick, also the grid wires 1b become thick. In order to increase the capacity density of the battery plate, therefore, the meshes 1c into which an active material is to be filled must be enlarged. In an expand grid produced by the reciprocal method, the grid wires 1b are straightly stretched by the dice cutters 3, and hence the side faces of the grid wires 1b are configured by substantially flat face, so that the adhesiveness of the active material is easily impaired. In an expand grid which is produced from a thick metal sheet 1 by the reciprocal method, therefore, an active material filled into large meshes is easily drops off during usage. By contrast, in an expand grid produced by the rotary method, the side faces of the grid wires 1b are twisted by the stretching operation during the expanding step to be formed into curved faces. Therefore, the adhesiveness of the active material is improved, so that, even when an active material is filled into large meshes 1c, the active material drops off with less probability.

Problem (3) to be Solved by the Invention

The rotary production method has the advantages of a high speed of producing an expand grid and high productivity, but has a problem in that, during the expanding step, high tension acts only on a part of the grid wires 1b surrounding each mesh 1c of a substantially rhombic shape, and hence the grid wires 1b easily corrode to lower the life performance. In the expanding step in the rotary method, as shown in FIG. 17, the metal sheet 1 is stretched as being transported along the advancing direction F. As shown in FIG. 19, therefore, higher tension E acts on grid wires 1b+ which are more inclined toward the outer side (in FIG. 19, the downward expanding direction) as further proceeding in the advancing direction F. Namely, each mesh 1c is made larger during the expanding step as further proceeding in the advancing direction F. When each mesh 1c is deformed in this way, therefore, the grid wires 1b+ which are downward inclined to the right in FIG. 19 receive higher tension E to be in a fully stretched condition, but grid wires 1b− which are downward inclined to the left is to be in a slightly slackened condition. When a storage battery is produced by using such an expand grid which was expanded in an uneven condition of the tension acting on the grid wires 1b, as a battery plate, only the grid wires 1b+ which receive the higher tension E corrode at a higher speed, and the life performance of the storage battery is lowered.

SUMMARY OF THE INVENTION

The invention has been conducted in order to solve the above-discussed problems. It is an object of the invention to provide a storage battery in which an expand grid is improved with respect to the widths of grid wires, the sectional areas of nodes, and the shapes of meshes, whereby the productivity of the expand grid can be enhanced and the life performance can be improved.

Means for Solving Problem (1)

A specific embodiment of the present invention is directed to a storage battery in which an expand grid is used as a battery plate. The expand grid is a grid member formed by expanding a side portion of a collector frame portion of a metal sheet to connect a large number of grid wires to one another in a net-like shape. Widths of grid wires of one row, which is directly connected to the collector frame portion of the expand grid, and of another, lateral end row are larger than widths of grid wires of at least one intermediate row between the directly-connected one row and the end row.

According to a specific embodiment of the present invention, the grid wires of the row which is directly connected to the collector frame portion are made larger in width so as to be hardly cracked. This prevents the capacity of the storage battery from being largely reduced by a crack from corrosion of the grid wires connected to the collector frame portion. Also, because the grid wires of the lateral end row with respect to the collector frame portion are made larger in width so as to be hardly cracked, it is possible to prevent a production failure from being caused by a crack of corrosion of the grid wires of the end portion during an expanding step in the rotary or reciprocal method.

In the expand grid, three or more rows of grid wires are arranged on the lateral side of the collector frame portion. In an expand grid produced by the rotary method, the grid wires of the lateral end row are connected to another frame portion (lower frame portion) which is different from the collector frame portion. By contrast, in an expand grid produced by the reciprocal method, the grid is usually terminated by the grid wires of the lateral end row. A frame portion is an unexpanded area of the metal sheet and having a width which is of a certain degree or sufficiently larger than the widths of the grid wires. A collector frame portion is a frame portion which is used for collecting currents from grid wires, and on which a plate lug to be connected to a terminal is usually formed. In the case of the rotary method in which a frame portion is formed on each of the sides, one of the frame portions is used as the collector frame portion. Grid wires have a thin strip-like shape which is formed by cutting a metal sheet. As a result of expansion, grid wires in each row are arranged while being alternately inclined in a zigzag manner. A large number of rows of the zigzag grid wires are sequentially connected to one another on the lateral side of the collector frame portion, to be formed into a net-like shape. In both the rotary method and the reciprocal method, grid wires of the same row are worked by the same disk or dice cutter, and therefore all grid wires of the same row are usually equal in width to one another.

The width of a grid wire is not equal to the thickness of the metal sheet itself, but equal to the cutting pitch of the metal sheet by the disk cutters in the rotary method or the dice cutters in the reciprocal method (the width is sometimes reduced as a result of extension of the grid wire due to expansion). As shown in FIG. 20, when a side portion of the collector frame portion $1a$ of the metal sheet 1 is expanded by the rotary or reciprocal method to be formed into a large number of grid wires $1b$ connected in a net-like shape, for example, the width of each of the grid wires $1b$ is not equal to the length Lt depending on the thickness of the metal sheet 1, but equal to the length Lw depending on the cutting pitch. In FIG. 20, the shapes of the expanded grid wires $1b$ are schematically shown in a flat form in order not to differentiate between the rotary method and the reciprocal method.

In another specific embodiment of the present invention, the widths of the grid wires of the row which is directly connected to the collector frame portion are largest. Also, the widths of the grid wires of the lateral end row are smaller than the widths of the grid wires of the row which is directly connected to the collector frame portion, and larger than the widths of the grid wires of at least one of the intermediate rows excluding the row which is directly connected to the collector frame portion, and the lateral end row.

Because the grid wires of the row which is directly connected to the collector frame portion have the largest width, a crack of the grid wires due to corrosion during usage which exerts the greatest effect on the life performance can be surely prevented from occurring. Also, because the grid wires of the lateral end row with respect to the collector frame portion are made larger in width than those of the intermediate rows so as to be hardly cracked, it is possible to prevent the production yield from being lowered by a production failure.

In another specific embodiment of the present invention, the largest grid wire width is not smaller than 1.2 times and not larger than 1.6 times the smallest grid wire width.

Because the largest width of the grid wires is not smaller than 1.2 times the smallest width, it is possible to achieve the effect due to the increased widths of the grid wires of the row which is directly connected to the collector frame portion, and the lateral end row. When the widths of all the grid wires are increased, the rate of the filling quantity of the active material with respect to the expand grid in the battery plate is excessively reduced, and hence the energy density of the storage battery is lowered. Therefore, the widths of the grid wires of the intermediate rows remain as small as possible, so as to prevent the energy density from being lowered. Since the largest width of the grid wires is not larger than 1.6 times the smallest width, the difference between the grid wire widths is not so excessive as to cause weaker grid wires of small width from being easily cracked during the expanding step in the rotary or reciprocal method.

Means for Solving Problem (2)

Yet another specific embodiment of the present invention is directed to a storage battery in which an expand grid is used as a battery plate. The expand grid is a grid member formed to have a large number of rows of slits intermitted at regular intervals in a metal sheet. Intermittent portions of the slits are arranged in a zigzag manner. The metal sheet is stretched widthwise to expand the metal sheet, resulting in grid wires being connected to one another in a net-like shape via nodes configured by the intermittent portions. The grid wires occur between slits that are adjacent to each other in the width direction. In each of the nodes, a node sectional area of a maximum section along a cutting plane of the slits is two or more times a grid wire sectional area of a section of each of the grid wires, the section being perpendicular to a longitudinal direction of the grid wire.

The node sectional area of each of the nodes in the expand grid which is produced by the rotary method is two or more times the grid wire sectional area of each of the grid wires. Even when a thick metal sheet is used in order to enhance the corrosion resistance so that the grid wire sectional area is increased and high tension acts on the nodes, it is possible to prevent the nodes from being ruptured or cracked.

As shown in FIG. 5 which schematically shows the vicinity of a node of an expand grid, the node sectional area $S_{con}$ of the node $1e$ is the largest one of sectional areas of sections of the node $1e$ along the cutting plane of the slits $1d$ (the cutting plane by the disk cutter 5). In FIG. 5, the node $1e$ is schematically shown in the form of a regular hexahedron. Actually, the node is pressed by the valleys $5b$ of the upper and lower disk cutters 5, and hence has a somewhat stepped shape. Therefore, the largest one of areas of sections of the node 1e along the cutting plane is defined as the node sectional area $S_{con}$. A grid wire sectional area S of the grid wire 1b is the area of a section of the grid wire 1b which is perpendicular to the longitudinal direction.

In still another specific embodiment of the present invention each of the meshes surrounded by the grid wires, which are connected to one another in a net-like shape via the nodes, has an area of 70 mm² or more.

Even when an expand grid is produced by using a thick metal sheet in order to enhance the corrosion resistance and form large meshes having an area of 70 mm² or more, the grid wires are twisted during the expanding step in the rotary method. Therefore, the adhesiveness of the active material to the meshes can be enhanced to prevent the active material from dropping off from the battery plate.

In another specific embodiment of the present invention, the grid wire sectional area is not smaller than 1.0 mm² and not larger than 3.5 mm². For example, even when tension acting on a node is particularly high, the node sectional area can be set to be 2.0 mm² or more. Therefore, it is possible to prevent the node from being ruptured or cracked. Since the grid wire sectional area never exceeds 3.5 mm², it also is possible to prevent the overcharge life from being shortened.

Means for Solving Problem (3)

Another specific embodiment of the present invention is directed to a storage battery in which an expand grid is used as a battery plate. The expand grid is a grid member formed to have a large number of slits in a metal sheet oriented in a zigzag manner. The metal sheet is expanded widthwise expanding the slits into meshes, thereby connecting four grid wires surrounding each of the meshes to one another in a net-like shape. Opposed ones of the four grid wires surrounding each of the meshes have substantially the same length. A length of two opposed ones of the grid wires is not smaller than 102% of and not larger than 120% of a length of other two opposed ones of the grid wires.

Because two opposed ones of the grid wires surrounding each of the meshes are longer than two other opposed grid wires, the mesh has a substantial parallelogram shape having long and short sides of different lengths. When grid wires on the side which receives higher tension during the expanding step in the rotary method are set to the long sides, therefore, the tension acting on the grid wires of the long sides is reduced, and the tension acting on the grid wires of the short sides is increased. Consequently, stress acts in a relatively uniform manner on the four grid wires surrounding each mesh, so that a phenomenon in which only a part of the grid wires is easily corroded can be prevented from occurring and the life performance of the storage battery can be improved.

BRIEF DESCRIPTION OF THE DRAWINGS

FIG. 7 is a view showing changes of the life period and the rate of crack of corrosion with respect to the ratio of widths of grid wires;

FIG. 8 is a view showing changes of the number of life cycles with respect to the grid wire sectional area;

FIG. 9 is a view showing changes of the rate of crack of corrosion with respect to the node sectional area;

FIG. 10 is a view showing changes of the drop rate of an active material with respect to a mesh area;

FIG. 12 is a plan view of the expand grid produced by the reciprocal method in the conventional art example;

FIG. 13 is a side view showing a step of forming slits of an expand grid by the rotary method in a conventional art example;

FIG. 14(a) is a side view showing a disk cutter used in the step of forming slits of the expand grid by the rotary method in the conventional art example, FIG. 14(b) is a plan view taken along the line B-B, and FIG. 14(c) is a partial enlarged side view of the vicinity of the line B-B;

FIG. 16(a) is a partial enlarged side view of an expand grid in which slits are formed in a slit forming step in the rotary method in a conventional art example, and FIG. 16(b) is a partial enlarged plan view;

DETAILED DESCRIPTION OF THE PREFERRED EMBODIMENTS

Hereinafter, embodiments of the invention will be described with reference to the accompanying drawings.

Embodiment (1) of the Invention

Figure 1:
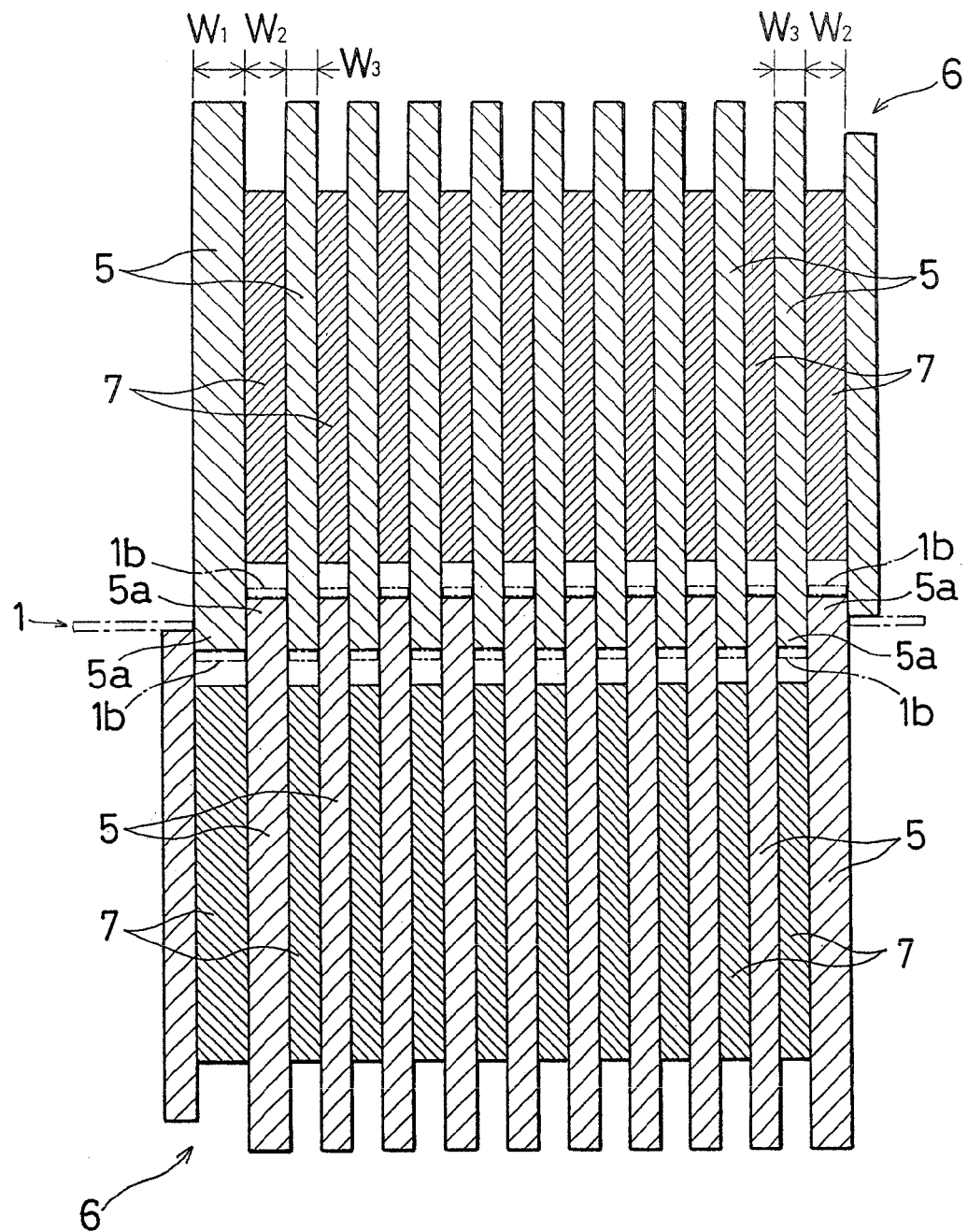
FIG. 1 is a longitudinal-section front view showing the case where the thicknesses of disk cutters are varied, taken along the line A-A in FIG. 13.
Figure 2A:
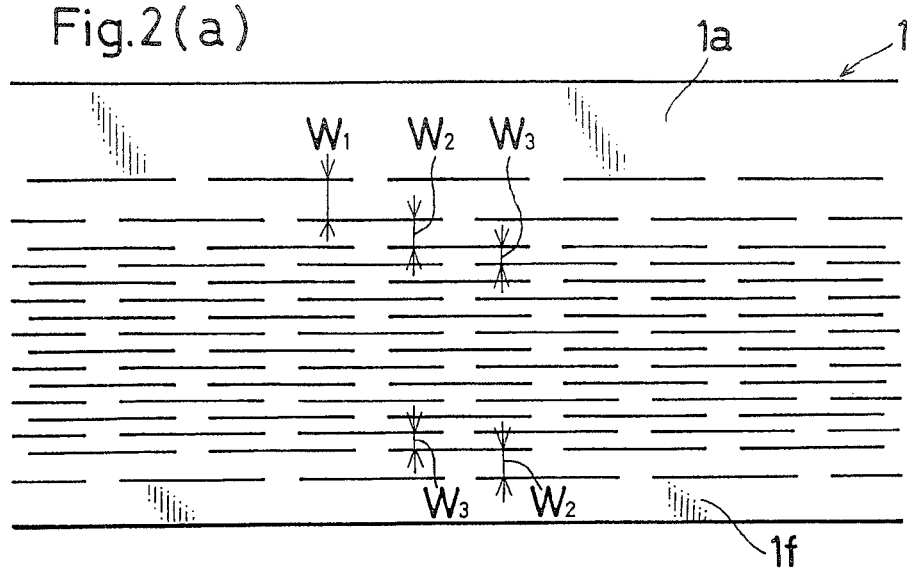
FIG. 2(a) is a plan view of a metal sheet in which slits are formed by using a disk cutter roll shown in FIG. 1.
Figure 2B:
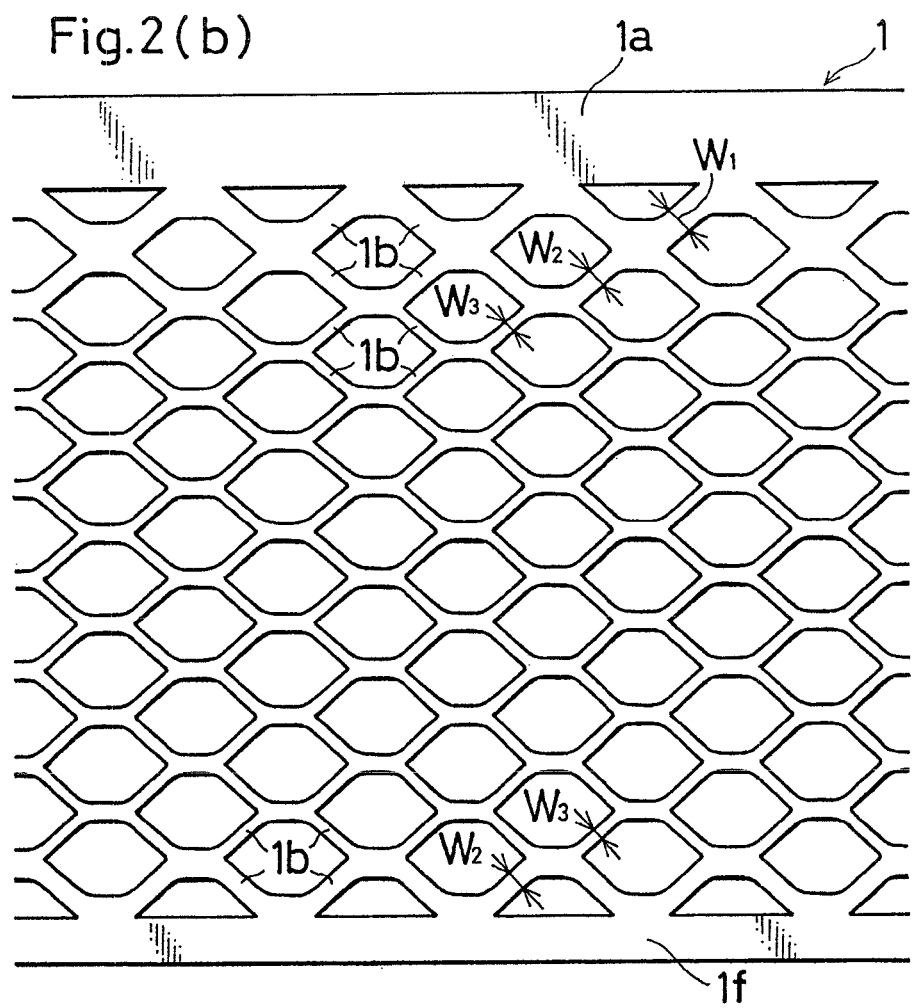
FIG. 2(b) is a plan view of an expand grid which is obtained by expanding the metal sheet.
Figure 3:
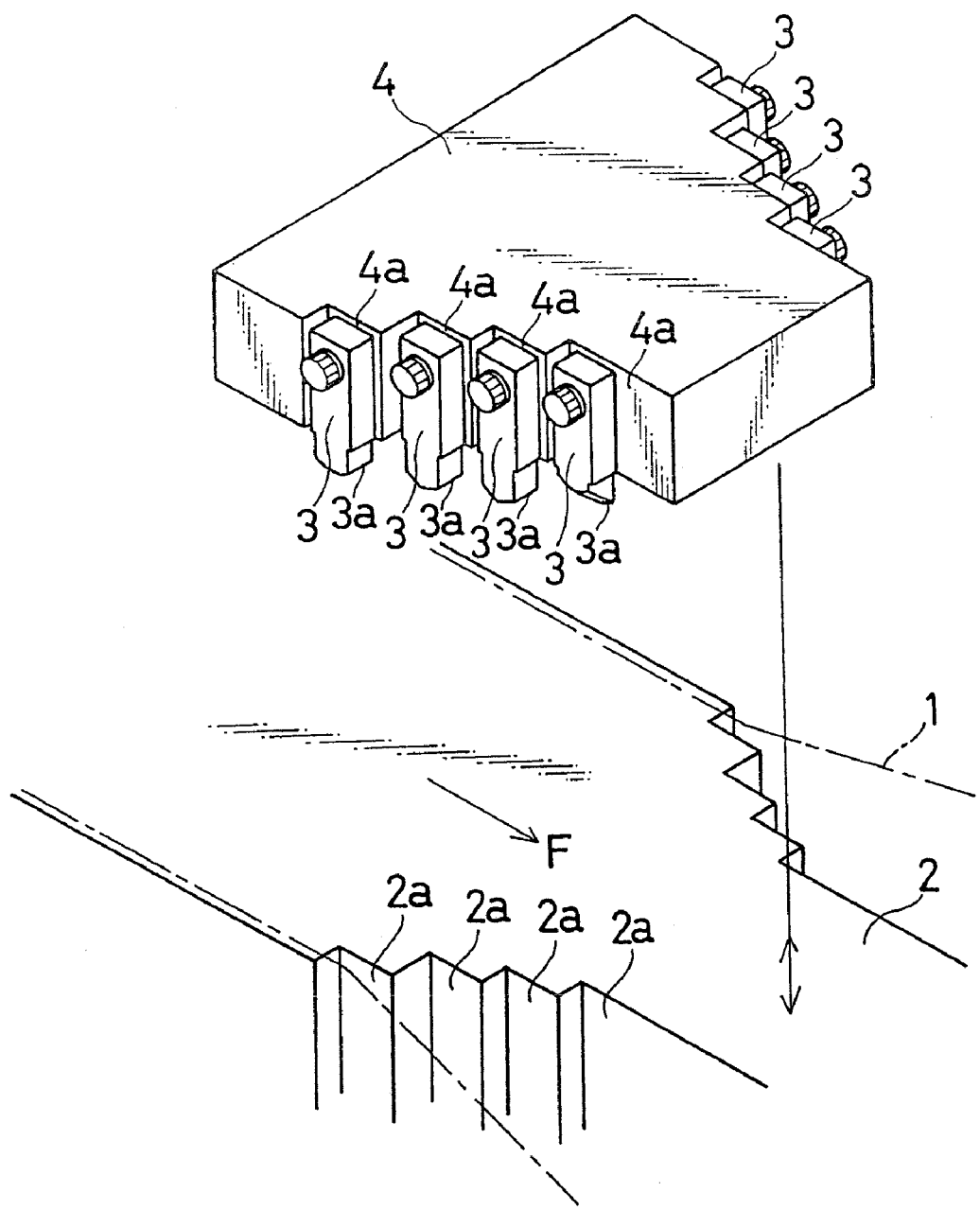
FIG. 3 is a perspective view schematically showing a step of producing an expand grid in which attachment steps of dice cutters are varied in the reciprocal method.
Figure 4:
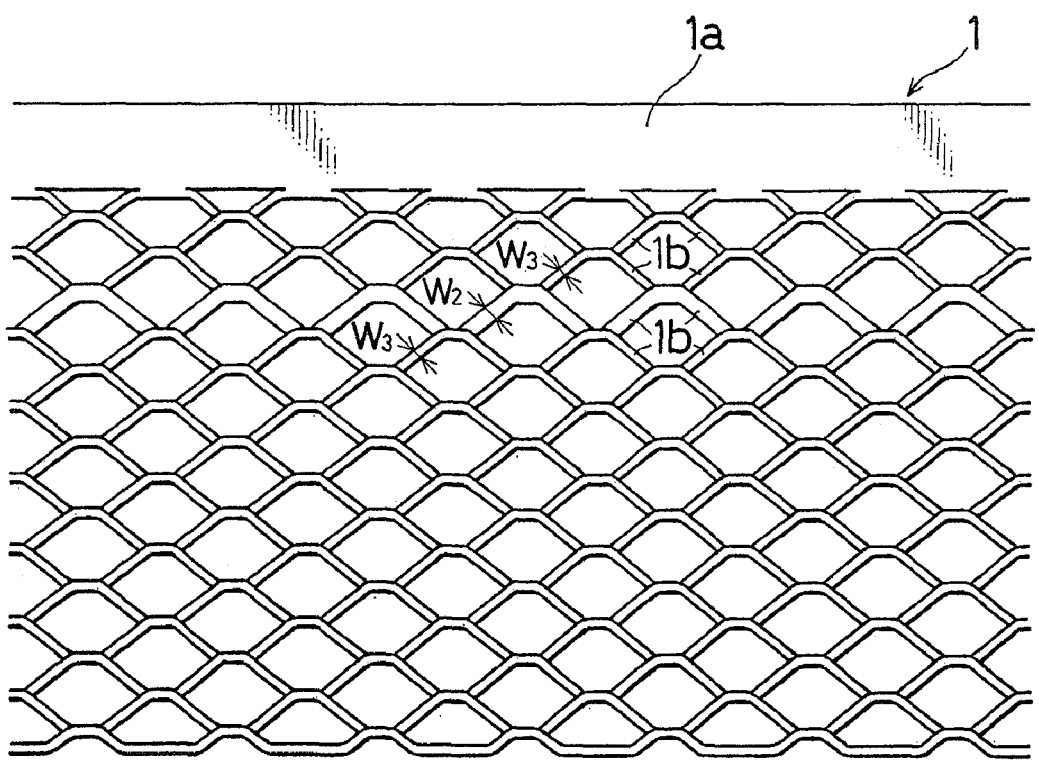
FIG. 4 is a plan view of the expand grid which is produced by the reciprocal method shown in FIG. 3.

FIGS. 1 to 4 show a first embodiment of the invention. FIG. 1 is a longitudinal-section front view showing the case where the thicknesses of disk cutters are varied, taken along the line A-A in FIG. 13, FIG. 2(a) is a plan view of a metal sheet in which slits are formed by using a disk cutter roll shown in FIG. 1, FIG. 2(b) is a plan view of an expand grid which is obtained by expanding the metal sheet, FIG. 3 is a perspective view schematically showing a step of producing an expand grid in which attachment steps of dice cutters are varied in the reciprocal method, and FIG. 4 is a plan view of the expand grid which is produced by the reciprocal method shown in FIG. 3.

In the embodiment, storage batteries in which an expand grid produced by either of the rotary and reciprocal methods is used as a battery plate will be described.

Figure 18:
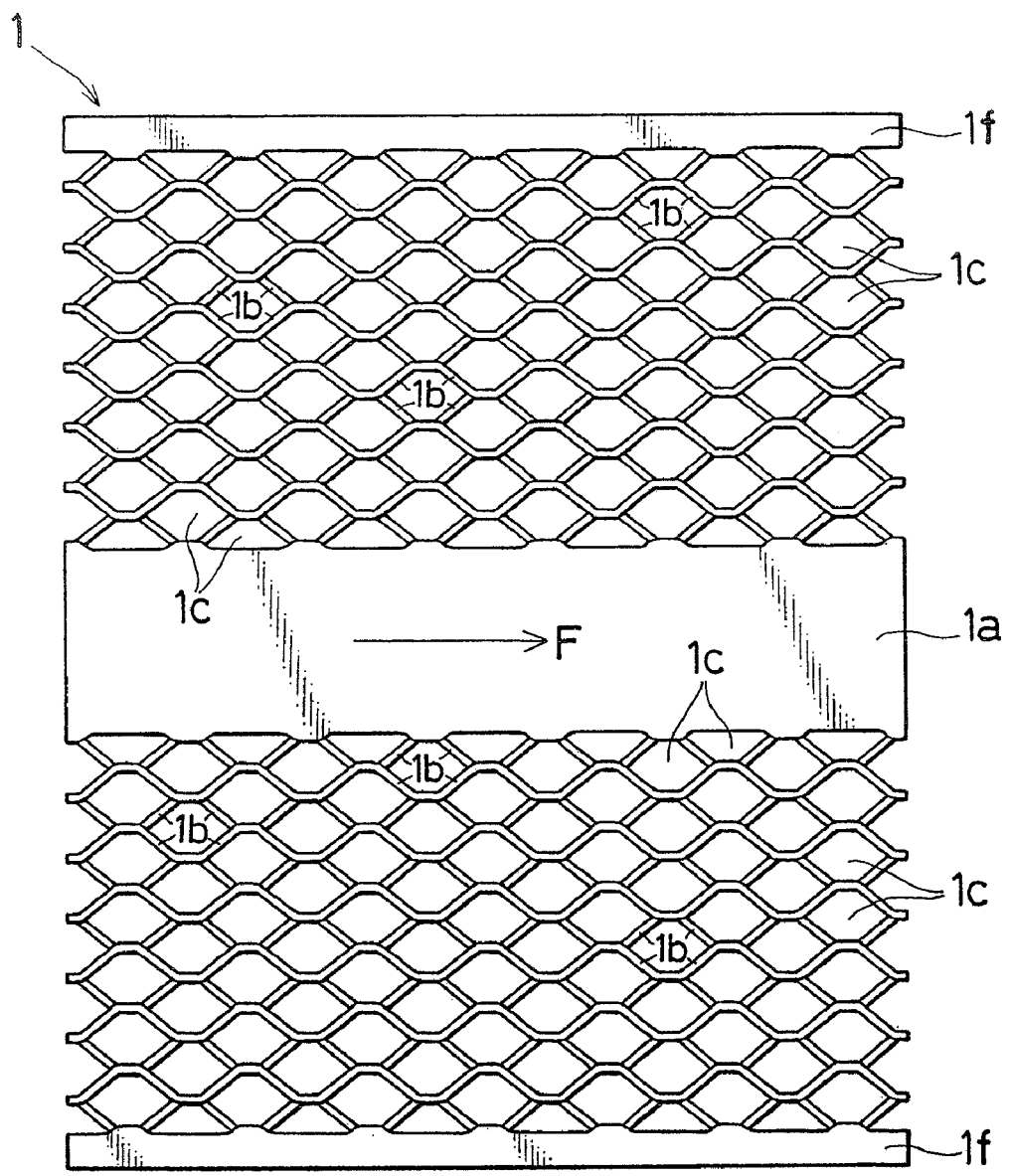
FIG. 18 is a plan view of an expand grid which is produced by the rotary method in a conventional art example.
Figure 19:
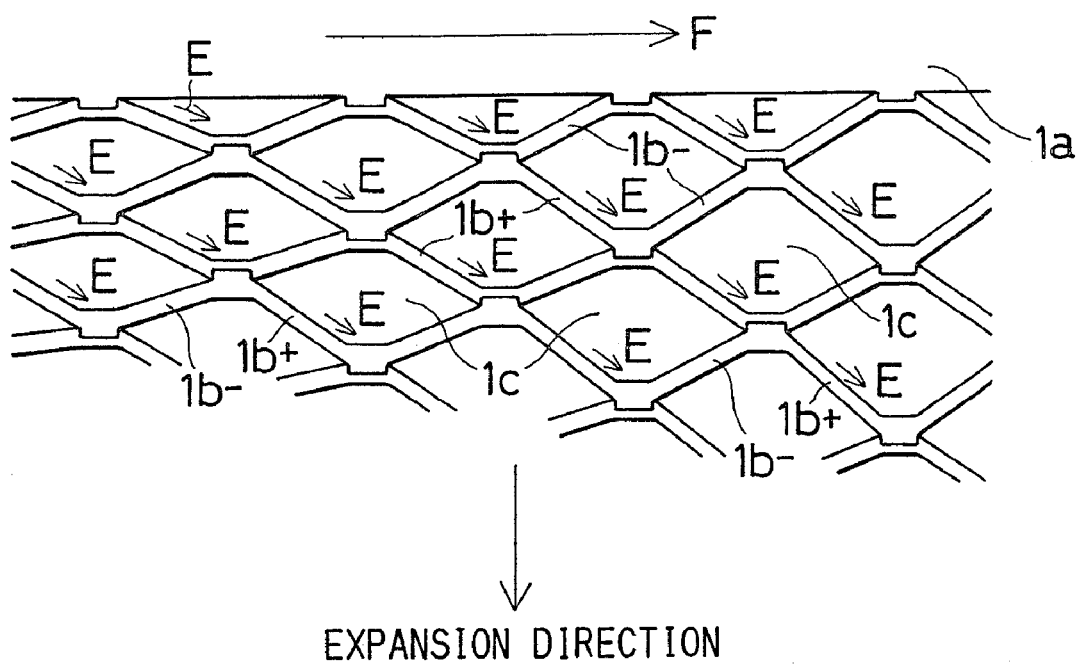
FIG. 19 is a partial enlarged plan view of an expand grid which is in the course of expansion in an expanding step by the rotary method in a conventional art example.
Figure 20:
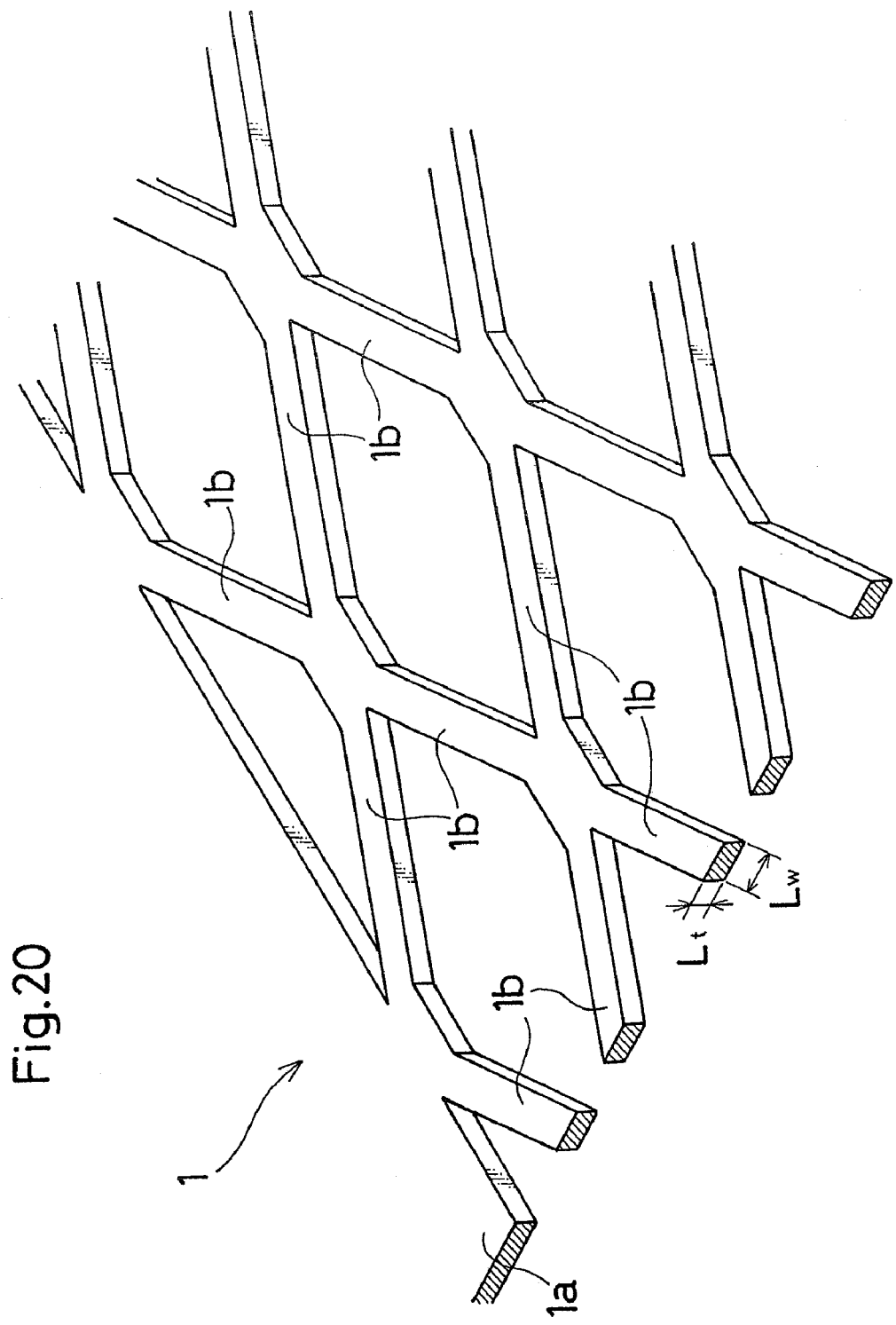
FIG. 20 is a partial enlarged perspective view of an expand grid.

In the expand grid shown in FIG. 18 and produced by the rotary method, and that shown in FIG. 12 and produced by the reciprocal method, the reduction of the capacity of the battery plate due to a crack of corrosion of the grid wires 1b is greatest when such a crack of corrosion occurs in a grid wire 1b which is close to the collector frame portion 1a. Therefore, it is preferable to set the widths of the grid wires 1b to be larger so that a crack of corrosion more hardly occurs, as the row of the grid wires is closer to the collector frame portion 1a. On the other hand, in the expand grid shown in FIG. 18 and produced by the rotary method, higher tensile stress acts during the expanding step on an end portion which is laterally (in vertical direction in FIG. 18) remoter from the collector frame portion 1a, so that the end portion is easily cracked. In the expand grid shown in FIG. 12 and produced by the reciprocal method, the grid wires 1b of the lateral end portion which is remotest from the collector frame portion 1a, and which is first stretched are easily cracked by process vibrations due to the vertical motions of the dice cutters 3 or the intermittent motion of the metal sheet 1. Therefore, it is preferable to increase also the widths of the grid wires 1b which are close to the lateral end with respect to the collector frame portion 1a. Usually, a plate lug is formed on the collector frame portion 1a, and the battery plate is accommodated in a battery case with directing the plate lug upward. In the expand grid, therefore, it is preferable to set the widths of the grid wires 1b to be larger as the grid wires are closer to the upper or lower portion. In the most preferable mode of the invention, consequently, the grid wire widths of a row close to the collector frame portion which affect the life performance during usage are set to be largest, the grid wire width is gradually reduced as advancing toward the laterally intermediate portion, and the grid wire width is gradually increased as advancing from the intermediate portion to the lateral end. In the case where only two kinds of grid wires or grid wires of larger and smaller widths are formed, a configuration may be employed in which only the grid wires of the one row that is directly connected to the collector frame portion, or two more rows that are close to the collector frame portion, and the one row that is in the lateral end with respect to the collector frame portion, or two more rows that are close to the lateral end have the larger width, and the grid wires of the intermediate rows other than the rows have the smaller width.

The effect of preventing the grid wires from being cracked cannot be sufficiently attained unless the difference between the grid wire widths is set so that the largest width is at least 1.2 times the smallest width. When an extremely large difference is set between the grid wire widths, however, the strength of grid wires of a larger width is excessively different from that of grid wires of a smaller width, so that a production failure often occurs. Therefore, it is preferably to set the largest grid wire width so as not to be larger than 1.6 times the smallest grid wire width.

The expand grid of the invention can be obtained in the following manner.

In the rotary method, the widths of grid wires of a net-like shape in the expand grid can be varied depending on the row, by increasing the thickness of a disk cutter which is placed in a portion where the grid wire width is to be increased. When the grid wire width is to be reduced, the thickness of a disk cutter which is placed in the corresponding portion is reduced.

Steps of forming slits in an expand grid by the rotary production method will be described with reference to FIG. 1.

Figure 15:
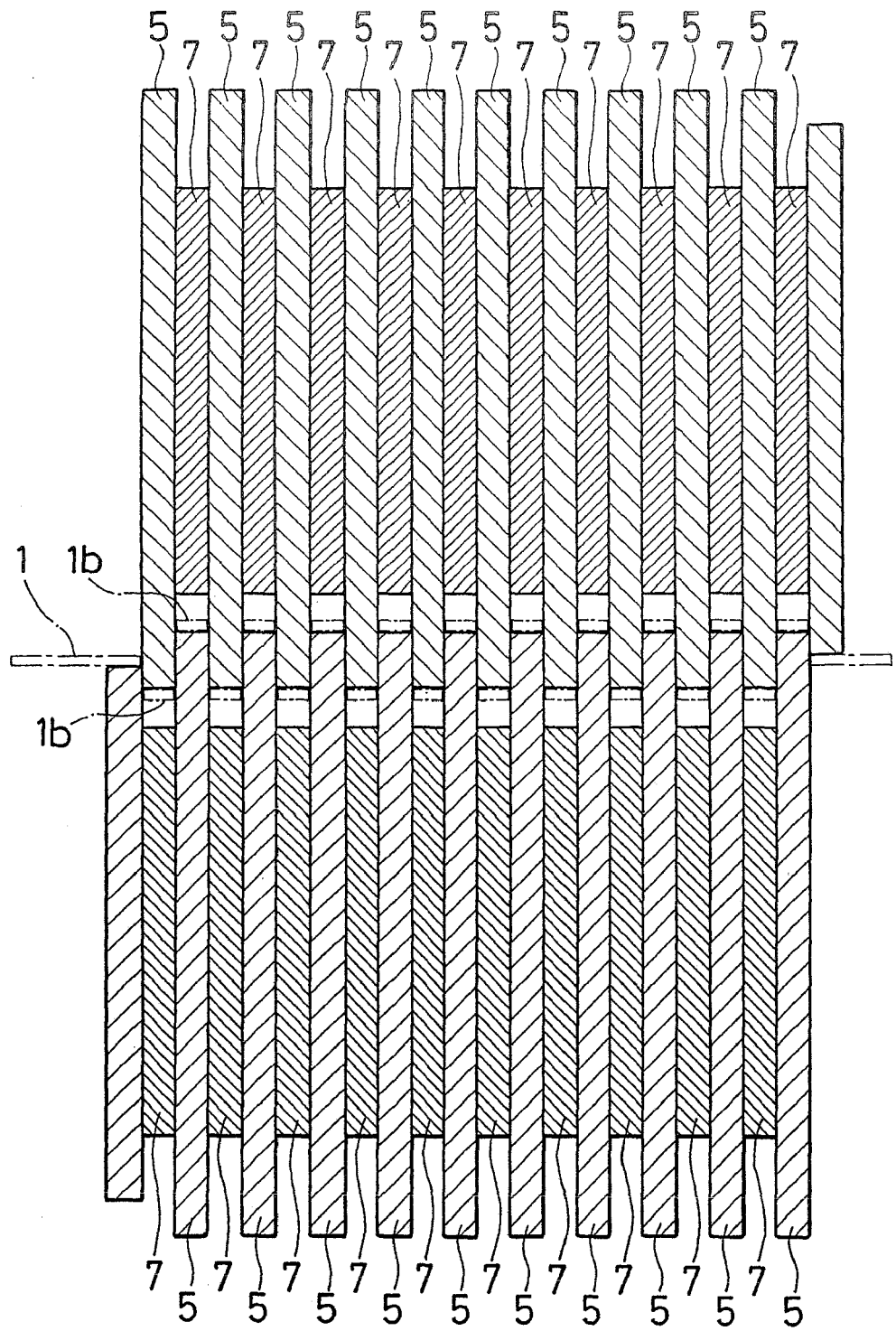
FIG. 15 is a longitudinal-section front view showing the conventional art example, taken along the line A-A in FIG. 13.
Figure 17:
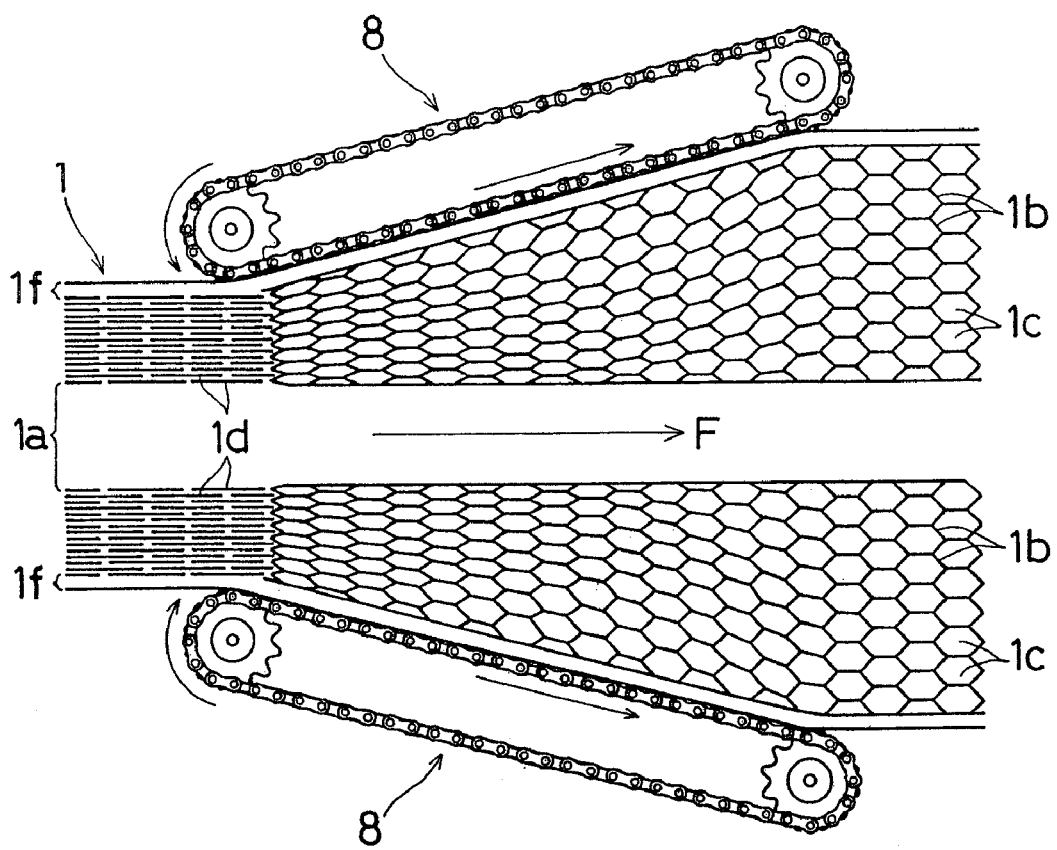
FIG. 17 is a plan view showing a step of expanding an expand grid by the rotary method in a conventional art example.

As shown in FIG. 13, the metal sheet 1 is passed in the advancing direction F between the disk cutter rolls 6 which are vertically arranged, whereby slits are formed in the metal sheet 1. Also in the case of FIG. 1, in the same manner as the disk cutter rolls shown in FIG. 15, each of the disk cutter rolls 6 is configured by stacking a large number of the disk cutters 5 on the same shaft via the spacers 7 which are used for forming gaps between the disk cutters 5. Therefore, the peripheral edges of the disk cutters 5 of the upper and lower disk cutter rolls 6 are engaged with each other to form slits in the metal sheet 1 which is inserted between the rolls from the front side of FIG. 1. The grid wires 1b which are configured by gaps between adjacent slits of the metal sheet 1 are pressed by the ridges 5a formed on the circumferential faces of the upper and lower disk cutters 5, to be protruded from the lower and upper faces of the metal sheet 1.

In the disk cutter rolls 6, as shown in FIG. 1, the disk cutter 5 and the spacer 7 which are closest (the left side in the figure) to the collector frame portion 1a of the metal sheet 1 have the largest thickness $W_1$, the spacer 7 and the disk cutter 5 which are next closest to the collector frame portion 1a, and the spacer 7 and the disk cutter 5 which are in the end that is laterally remotest (the right side in the figure) from the collector frame portion 1a have the second largest thickness $W_2$, and the other disk cutters 5 and the other spacers 7 have the smallest thickness $W_3$. In the metal sheet 1 in which slits are formed by using the thus configured disk cutter rolls 6, as shown in FIG. 2(a), the width $W_1$ between the slits which are closest to the collector frame portion 1a is largest, the widths $W_2$ between the slits which are next closest to the collector frame portion 1a, and between those which are remotest from the collector frame portion 1a are second largest, and the widths $W_3$ between the other slits are smallest. When the metal sheet 1 is expanded, as shown in FIG. 2(b), the width $W_1$ of the grid wires 1b of the row which is directly connected to the collector frame portion 1a is largest, the widths $W_2$ of the grid wires 1b of the next row which is connected to the above-mentioned grid wires 1b, and the grid wires 1b of the row which is remotest from the collector frame portion 1a are second largest, and the widths $W_3$ of the grid wires 1b of the other rows are smallest. In FIGS. 1 and 2, the differences of the widths between the slits, and of the grid wires 1b are shown in exaggerated form in order to facilitate description. In FIG. 2(b), the widths are shown with neglecting the phenomenon that the widths of the grid wires 1b are reduced as a result of extension during the expanding process.

In the production method shown in FIGS. 13 and 1, the two upper and lower disk cutter rolls 6 are used. Also in the case where three or more disk cutter rolls 6 are used, the widths of the grid wires 1b can be varied by similarly adjusting the thicknesses of the disk cutters 5 and the spacers 7.

In the rotary production method described above, the expansion shown in FIG. 2(b) is conducted by, while the collector frame portion 1a of the metal sheet 1 shown in FIG. 2(a) is fixed, further outward pulling the lower frame portion 1f in the lateral end portion (the lower end portion in FIG. 2). In the case where the grid wires 1b which are close to the lower frame portion 1f have a small widths $W_2$ and are low in strength, therefore, there arises the possibility that the grid wires 1b are cracked. This phenomenon is not limited to the grid wires 1b which are close to the lower frame portion 1f, and occurs in a substantially similar manner in also the grid wires 1b which are close to the collector frame portion 1a. Also when the pulling direction is reversed, there is the possibility that the grid wires 1b in the vicinity of the both lateral end portions are cracked during the expanding process.

In the reciprocal method, the expansion is conducted by vertical motions of plural dice cutters which are arranged in a stepwise manner above a metal sheet that is intermittently moved. When the step difference between two of the dice cutters is increased, therefore, the widths of grid wires of the corresponding row can be increased.

Figure 11:
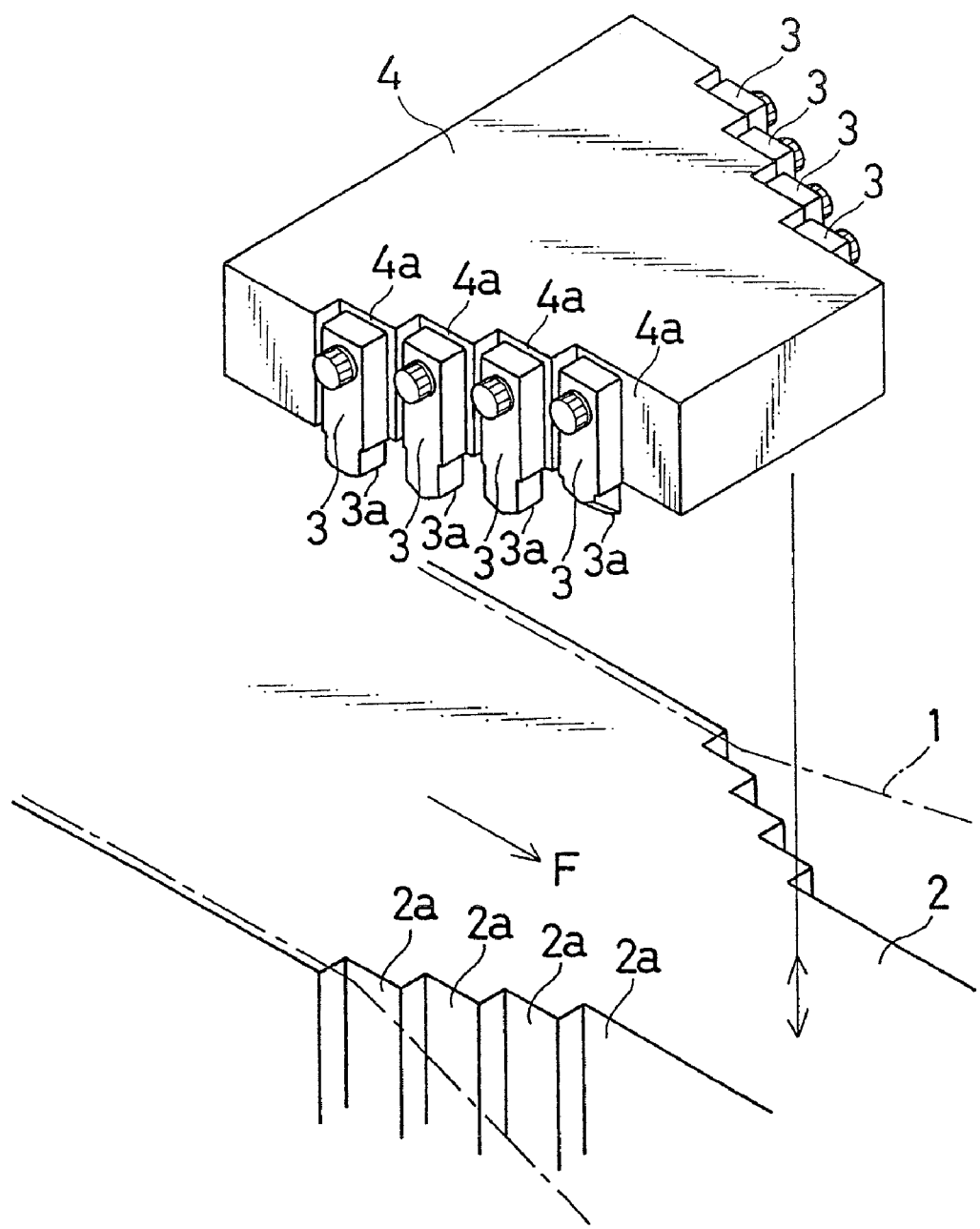
FIG. 11 is a perspective view schematically showing a production step of an expand grid by the reciprocal method in a conventional art example.

An example in which an expand grid is produced by the reciprocal method will be described with reference to FIG. 3. In the same manner as the case of FIG. 11, the metal sheet 1 is intermittently fed in the advancing direction F. The plurality of step-like side faces 2a (in the figure, only four steps are shown) are formed on each of the side faces of the lower table 2 on which the metal sheet 1 is placed and transported. The upper table 4 is placed above the lower table 2. In the same manner as the lower table 2, the upper table 4 is provided with plural steps of step-like side faces 4a on each of the side faces. The dice cutters 3 each having the edge 3a for an expanding process are attached to the step-like side faces 4a of the upper table 4, respectively.

A gap of a size which allows the metal sheet 1 to be passed therethrough is formed between the upper table 4 and the lower table 2. The upper table 4 repeats the vertical motions in accordance with the intermittent movement of the metal sheet 1. As a result of the vertical motions of the upper table 4, the edges 3a of the dice cutters 3 form slits in the metal sheet 1 and downward stretch the slits to form a net-like grid wires. The step-like side face 2a which is placed inward by one step from the largest width portion of the lower table 2 corresponds to the lowest stage of the expand grid.

In the embodiment, a larger step difference is disposed in the step-like side faces 4a and 2a of the upper and lower tables 4 and 2. Specifically, referring to FIG. 3, the step difference between the step-like side face 4a to which the outermost dice cutter 3 is attached, and the step-like side face 4a to which the next-inner dice cutter 3 is attached is larger than the other step differences. The widths of the grid wires corresponding to the large step difference are made larger by using the thus configured production apparatus. When such a step difference is formed in the upper and lower tables 4 and 2 of an actual production apparatus to which the large number of dice cutters 3 are attached, the widths $W_2$ of the grid wires 1b of an arbitrary row can be made larger than the widths $W_3$ of the grid wires 1b of the other rows as shown in, for example, FIG. 4. By adequately selecting the rows in which the widths of the grid wires 1b are to be enlarged, in the same manner as the rotary method shown in FIG. 2(b), it is possible to increase only the widths of the grid wires 1b of the rows which are close to the collector frame portion 1a, and the row which is remote from the collector frame portion.

Embodiment (2) of the Invention

Figure 5:
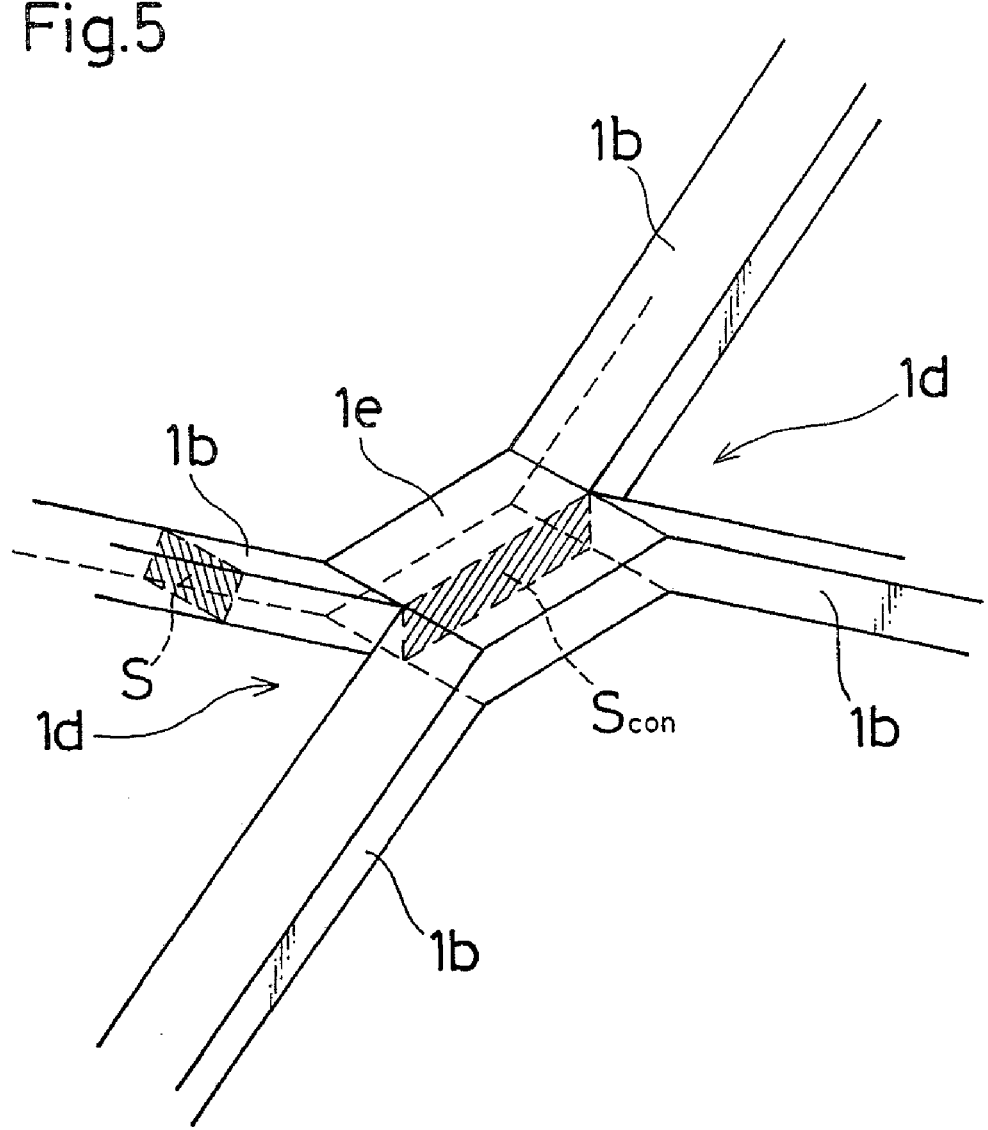
FIG. 5 is a partial enlarged perspective view of the vicinity of a node of an expand grid which is produced by the rotary method.

FIG. 5 shows a second embodiment of the invention, and is a partial enlarged perspective view of the vicinity of a node of an expand grid which is produced by the rotary method.

In the embodiment, a storage battery in which an expand grid produced by the rotary method is used as a battery plate will be described.

FIG. 5 is an enlarged schematic view showing the vicinity of the node 1e of the expand grid which is produced by the rotary method. In the expand grid of the embodiment, the node sectional area $S_{con}$ of the node 1e which is the largest one of sectional areas of sections of the node 1e along the cutting plane of the slits 1d is set to be two or more times the grid wire sectional area S of a section of the grid wire 1b which section is perpendicular to the longitudinal direction. According to the configuration, it is possible to prevent the node 1e from being deformed, ruptured, or cracked by tension which is produced when the grid wires 1b are stretched to both the sides in the expanding step in the rotary method. Even when meshes having an area of 70 mm$^2$ or more are formed, the grid wires 1b are twisted during the process of stretching to both the sides, in the expanding step in the rotary method. Therefore, the adhesiveness of the active material is higher than that in an expand grid which is produced by the reciprocal method, and in which the side faces of the grid wires 1b are formed as flat faces, and hence can be prevented from dropping off from the battery plate. When the areas of the meshes are excessively enlarged, however, a large quantity of the active material drop off during a production step in a mass production process. Therefore, it is preferable to set the mesh area so as not to be larger than 150 mm$^2$.

In an expand grid which is produced by the rotary method in the conventional art, deformation, a rupture, a crack of corrosion, or a like failure occurs very easily in the vicinities of connecting areas of the nodes 1e with the grid wires 1b. When the grid wire sectional area S of each grid wire 1b is set not to be smaller than 1.0 mm$^2$, such a failure can be surely prevented from occurring. In consideration of the overcharge life, however, it is preferable to set the grid wire sectional area S so as not to be larger than 3.5 mm$^2$.

Embodiment (3) of the Invention

Figure 6:
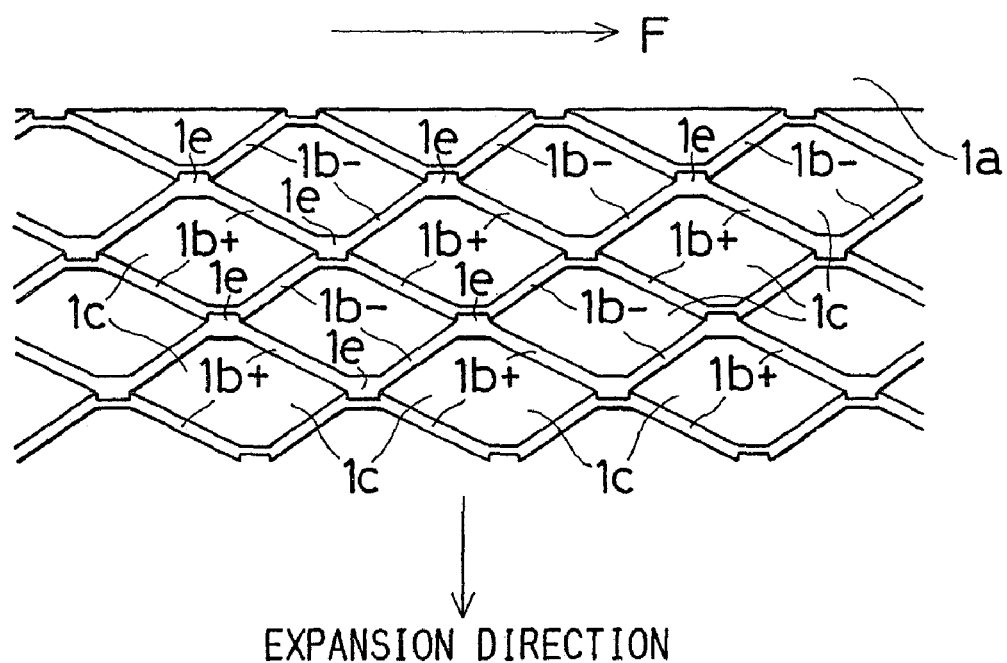
FIG. 6 is a partial enlarged plan view of an expand grid in which a mesh is expanded in an expanding step in the rotary method, into a parallelogram shape having different long and short sides.

FIG. 6 shows a third embodiment of the invention, and is a partial enlarged plan view of an expand grid in which a mesh is expanded in an expanding step in the rotary method, into a parallelogram shape having different long and short sides.

In the embodiment also, a storage battery in which an expand grid produced by the rotary method is used as a battery plate will be described.

As shown in FIG. 6, the meshes 1c of the expand grid which is produced by the rotary method have a substantial parallelogram shape, except those which are adjacent to the collector frame portion 1a, and which have a substantially triangular shape. Namely, each of the meshes 1c is configured by the four nodes 1e which are positioned respectively at the apexes of the parallelogram, and the four grid wires 1b which connect the nodes 1e to one another.

As shown in FIG. 18, each of the meshes is of the conventional expand grid which is produced by the rotary method has a substantial parallelogram shape having the sides of the same length, or a substantially rhombic shape. Therefore, the four grid wires 1b surrounding the mesh 1c are approximately equal in length to one another. By contrast, in the embodiment, as shown in FIG. 6, each of the meshes 1c has a substantial parallelogram shape having long and short sides of different lengths. In the four grid wires 1b surrounding the mesh 1c, the two grid wires 1b+ which are more inclined toward the outer side (in FIG. 6, the downward expanding direction) as proceeding in the advancing direction F of the metal sheet 1 are made longer, and the two grid wires 1b− which are inclined toward the inner side (in FIG. 6, toward the collector frame portion 1a in the upper side) as proceeding in the advancing direction F are made shorter. The longer grid wires 1b+ are formed so as to have a length which is not smaller than 102% of and not larger than 120% of the length of the shorter grid wires 1b−.

The expand grid in which the grid wires 1b surrounding each mesh 1c have different lengths can be produced by the rotary method with setting every second ridge 5a of the disk cutter 5 shown in, for example, FIG. 14 to have a larger amount of protrusion toward the outer peripheral side (the peripheral length along the protrusion shape of the ridge 5a is increased). When the slits $1d$ are formed by the conventional disk cutters 5 in which the ridges $5a$ protrude in the same amount, the grid wires $1b$ which are pressed by the ridges $5a$ to be protrudingly deformed in the upward and downward directions have the same length as shown in FIG. $16(a)$. By contrast, the grid wires $1b$ which are pressed by the ridges $5a$ of the larger protrusion amount are largely protrudingly deformed in the upward and downward directions, and stretched to be prolonged as a result of the deformation.

When the metal sheet 1 which has undergone the slit forming step in this way is expanded in the expanding step, the meshes $1c$ surrounded by the grid wires $1b$ of different lengths are formed into a substantial parallelogram shape having long and short sides of different lengths as shown in FIG. 6. In this case, the longer grid wires $1b+$ are set so as to be more inclined toward the outer side as further proceeding in the advancing direction F of the metal sheet 1.

In the thus configured expand grid, although the longer grid wires $1b+$ are largely deformed in the slit forming step in the rotary method, the longer grid wires can avoid receiving high tension in the expanding step because the longer grid wires have been already largely stretched. As a result, it is possible to cause the two longer grid wires $1b+$ and the two shorter grid wires $1b-$ which surround each mesh $1c$ to receive substantially equal stress in the slit forming and expanding steps.

Expand grids of various ratios of the length of the longer grid wires $1b+$ to that of the shorter grid wires $1b-$ have been produced and studied. As a result, it has been found that, when the length ratio is not smaller than 102% and not larger than 120%, all the grid wires $1b$ are effectively prevented from being corroded. This is because of the following reason. When the length ratio is smaller than 102%, there is no substantial difference as compared with a conventional expand grid produced by the rotary method, or corrosion is caused to proceed only in the longer grid wires $1b+$ by the unbalance of tension in the expanding step, and, when the length ratio is larger than 120%, the expand grid is not sufficiently expanded in the expanding step to produce a state in which the longer grid wires $1b+$ are slackened. When the length of the longer grid wires $1b+$ is not smaller than 106% and not larger than 115%, moreover, the difference between the progress of corrosion in the longer grid wires $1b+$, and that in the shorter grid wires $1b-$ can be made very small.

Example 1

Example 1 is an example of the first embodiment, and shows comparison between the case where the grid wires $1b$ which are directly connected to the lower frame portion $1f$ that is remotest from the collector frame portion $1a$ of the metal sheet 1 shown in FIG. 2 were set to have the smallest width, and that where the grid wires were set to have a larger width.

In Example 1, an alloy sheet of Pb—0.06 wt. % Ca—1.0 wt. % Sn was processed into expand grids by using the rotary production method. When the grid wires $1b$ of the row which is directly connected to the lower frame portion $1f$ that is remotest from the collector frame portion $1a$ were set to have the smallest width by adequately changing the thicknesses if disk cutters and spacers of a rotary expanding machine, a crack of corrosion was observed in 10% of the connections of the grid wires $1b$ and the lower frame portion $1f$, during the expanding step. By contrast, when the grid wires $1b$ of the row which is directly connected to the lower frame portion $1f$ were set to be larger in width than the grid wires $1b$ of the other or intermediate rows, the rate of crack of corrosion in the connections of the grid wires $1b$ and the lower frame portion if during the expanding step was reduced to about 2%.

Similar tests were conducted by using the reciprocal production method. In this case also, in the same manner as the case of the rotary production method, when the grid wires of the row which is remotest from the collector frame portion 1 were set to have the smallest width, a crack of corrosion was observed in about 6% of the grid wires during the expanding step. By contrast, when the widths of the grid wires were increased, the rate of crack of corrosion during the expanding step was reduced to about 1%.

Example 2

Example 2 is an example of the first embodiment, and shows comparison between the case where the grid wires $1b$ which are directly connected to the collector frame portion $1a$ of the metal sheet 1 shown in FIG. 2 were set to have the smallest width, and that where the grid wires were set to have a larger width.

In Example 2 also, an alloy sheet of Pb—0.6 wt. % Ca—1.0 wt. % Sn was processed into expand grids by using the rotary production method. An anode active material for a lead storage battery which was produced in the usual way was filled into the expand grids produced by the rotary production method, and the grids were then cured and dried to form positive plates for a lead storage battery. A cathode active material for a lead storage battery which was produced in the usual way was filled into identical expand grids, and the grids were then cured and dried to form negative plates for a lead storage battery.

Such positive and negative plates were alternately stacked via separators which are configured mainly by microporous polyethylene, and the plates of the same polarity were then connected to one another to form a plate group. Such plate groups were inserted into a battery case, and a given amount of dilute sulfuric acid electrolyte of a predetermined specific gravity was poured into the case, thereby producing lead storage batteries of Type 75D26 according to JIS.

In the example also, expand grids of various kinds of grid wire widths were produced by changing the thicknesses of disk cutters and spacers of a rotary expanding machine.

The lead storage batteries of Type 75D26 were subjected to a test of overcharging a battery at 75° C. (in which one cycle is set as the charging voltage of 13.8 V (the limit current of 25 A), the charging time of 117 h, the stand time of 49 h, and the discharging current of 200 A, and which is ended when the 2 second voltage at discharge becomes 3.0 V or lower).

When the grid wires $1b$ of the row which is directly connected to the collector frame portion $1a$ were set to have the smallest width, it was early judged that the battery life is exhausted. Lead storage batteries in which the life is exhausted were disassembled, and the conditions of the positive plates were observed. As a result, the collector frame portion $1a$ and the grid wires $1b$ which are directly connected to the portion were largely corroded, and, in a most severely corroded plate, the grid wires $1b$ were completely separated from the collector frame portion $1a$.

When the grid wires $1b$ of the row which is directly connected to the collector frame portion $1a$ were set to have a larger width, the above-mentioned phenomenon did not occur, and the life performance was more excellent as the grid wires $1b$ have a larger width. When also the widths of the grid wires $1b$ of the row adjacent to that which is directly connected to the collector frame portion $1a$ were set to be larger, the life performance was further improved.

Tests similar to those described above were conducted on grids produced by using the reciprocal production method. The results of the tests were identical with the test results in the case of the rotary production method.

Example 3

Example 3 is an example of the first embodiment, and shows comparison of expand grids in which the ratio of the width of the widest grid wire to that of the narrowest grid wire was variously changed.

In Example 3 also, an alloy sheet of Pb—0.6 wt. % Ca—1.0 wt. % Sn was processed into expand grids by using the rotary production method. An anode active material for a lead storage battery which was produced in the usual way was filled into expand grids produced by the rotary production method, and the grids were then cured and dried to form positive plates for a lead storage battery. A cathode active material for a lead storage battery which was produced in the usual way was filled into identical expand grids, and the grids were then cured and dried to form negative plates for a lead storage battery.

Such positive and negative plates were alternately stacked via separators which are configured mainly by microporous polyethylene, and the plates of the same polarity were then connected to one another to form a plate group. Such plate groups were inserted into a battery case, and a given amount of dilute sulfuric acid electrolyte of a predetermined specific gravity was poured into the case, thereby producing lead storage batteries of Type 75D26 according to JIS.

In the example also, expand grids of various kinds of grid wire widths were produced by changing the thicknesses of disk cutters and spacers of a rotary expanding machine.

The lead storage batteries of Type 75D26 were subjected to a test of overcharging a battery at 75° C. (in which one cycle is set as the charging voltage of 13.8 V (the limit current of 25 A), the charging time of 117 h, the stand time of 49 h, and the discharging current of 200 A, and which is ended when the voltage at 2 seconds becomes 3.0 V or lower). In the expand grids, grid wires of two rows which are close to the collector frame portion have the largest width, those of two rows which are next closest to the collector frame portion have the second largest width, and those of two rows which are remotest from the collector frame portion and close to the lower frame portion have the smallest width.

FIG. 7 shows results of the tests. In FIG. 7, the abscissa indicates the ratio of the width of the widest grid wire to that of the narrowest grid wire, and the ordinate indicates a life performance ratio with respect to the life performance of a lead storage battery using expand grids in which all grid wires have the same width, the life performance being set to 100, and the rate of crack of corrosion during production of an expand grid. As apparent from FIG. 7, in lead storage batteries using expand grids of the configuration of Example 3, the life performance was more remarkably improved as widths of grid wires are larger, but, when the width ratio of grid wires was made larger than 1.6 times, also the rate of crack of corrosion during production of an expand grid was abruptly increased. This was caused by a phenomenon that, during the step of expanding an expand grid, a grid wire of a larger width is hardly stretched, that of a smaller width is more easily stretched, and stress produced in the expanding step is therefore concentrated to grid wires of a smaller width.

Tests similar to those described above were conducted on grids produced by using the reciprocal production method. The results of the tests were identical with the test results in the case of the rotary production method.

Also in storage batteries which are other than a lead storage battery, and in which anode current collectors are corroded, similar results were obtained.

Example 4

Example 4 is an example of the second embodiment. In the example, expand grids produced by the rotary method were investigated for overcharge life while changing the grid wire sectional area S of the grid wires $1b$ of each expand grid.

In a method of producing an expand grid by using the rotary method, the thicknesses of the grid wires $1b$ can be varied by changing the thickness of the metal sheet 1, and the widths of the grid wires $1b$ can be varied by changing the thickness of the disk cutter 5 used in the slit forming step. Plural sets of the disk cutters 5 in different thicknesses were produced. While adequately replacing the disk cutter set with another one, and changing the thickness of the metal sheet 1, expand grids in which the grid wire sectional area S of the grid wires $1b$ ranges from 0.64 mm$^2$ (thickness: 0.8 mm×width: 0.8 mm) to 4.0 mm$^2$ (thickness: 2.0 mm×width: 2.0 mm) were produced by the rotary method. The expand grids are identical with one another in weight and external dimensions. After an active material was filled into the expand grids, the expand grids were cured and dried to form positive plates.

The positive plates of different grid wire sectional areas S, and negative plates which were produced by a conventional method were combined with separators which are configured mainly by microporous polyethylene to produce lead storage batteries of Type 55D23 (Japanese Industrial Standard JIS D 5301) for an automobile. A given amount of dilute sulfuric acid of a predetermined specific gravity was poured and formation was performed to complete the lead storage batteries. An overcharge life test (according to the test method of JIS D 5301) was conducted on the lead storage batteries.

FIG. 8 shows relationships between the grid wire sectional area S and the number of life cycles in the overcharge life test. As shown in FIG. 8, when the grid wire sectional area S of the grid wires $1b$ is smaller than 1.0 mm$^2$, the battery life is early exhausted due to corrosion of the grid, but, when the grid wire sectional area S is not smaller than 1.0 mm$^2$, the number of life cycles apparently shows a tendency to be further increased as the sectional area is larger. When the grid wire sectional area S is larger than 3.0 mm$^2$, the mesh size becomes large, and hence the active material is softened or drops off, so that the number of life cycles begins to be reduced. Therefore, it is preferable to set the grid wire sectional area S so as not to be larger than 3.5 mm$^2$.

Example 5

Example 5 is an example of the second embodiment. In the example, expand grids produced by the rotary method and having different grid wire sectional areas S of the grid wires $1b$ were investigated for rate of crack of corrosion, while changing the node sectional area $S_{con}$ of the nodes $1e$.

In a method of producing an expand grid by using the rotary method, the length of each node $1e$ in the direction of the slits $1d$ can be changed by changing the widths of the valleys $5b$ and the grooves $5c$ of the disk cutters 5 used in the slit forming step. Therefore, plural sets of the disk cutters 5 of different widths of the valleys $5b$ and the grooves $5c$ were produced, and expand grids were then produced by the rotary method while adequately replacing the disk cutter set with another one, and changing the grid wire sectional area S of the grid wires $1b$ by the method of Example 4. In this case, for the sake of comparison, the ridges $4a$ of the disk cutters 5 were always maintained constant in length on a circumference so that the longitudinal lengths of the grid wires 1b are equal to one another.

The manner of changes of the rate of crack of corrosion was investigated while changing the node sectional area $S_{con}$ for each of several kinds of different grid wire sectional areas S. FIG. 9 shows results of the investigation for the relationship between the ratio of the node sectional area $S_{con}$ to the grid wire sectional area S, and the rate of crack of corrosion with using various grid wire sectional areas S as parameters. As apparent from the figure, for any grid wire sectional area S, when the node sectional area $S_{con}$ is not smaller than two times (2S) the grid wire sectional area, the rate of crack of corrosion is surely reduced. When the grid wire sectional area S is not smaller than 1.0 mm², the reduction of the rate of crack of corrosion in the case where the node sectional area $S_{con}$ is not smaller than two times (2S) becomes remarkable.

Example 6

Example 6 is an example of the second embodiment. In the example, the drop rate of an active material which was filled into expand grids produced by the reciprocal and rotary methods was investigated.

Sets of plural expand grids were produced by the reciprocal and rotary methods so as to be equal to one another in weight and grid wire sectional area S. In the expand grids, each mesh has an area in the range of 50 mm² to 225 mm². After an active material was filled into the expand grids, the expand grids were cured and dried to form positive plates. The positive plates and negative plates which were produced by a conventional method were combined with separators which are configured mainly by microporous polyethylene to produce lead storage batteries of Type 55D23 (Japanese Industrial Standard JIS D 5301) for an automobile. A given amount of dilute sulfuric acid of a predetermined specific gravity was poured and formation was performed to complete the batteries. A light-load life test (according to the test method of JIS D 5301) was conducted on the lead storage batteries. The life test was interrupted at 3,000 cycles. The plates were taken out and horizontally placed. Thereafter, the drop rate (the number of dropping meshes/the total number of meshes) of the active material was investigated.

FIG. 10 shows results of the investigation for the relationship between the mesh area and the drop rate of an active material in both the reciprocal and rotary methods. It was observed that, in expand grids produced by the reciprocal method, the active material dropped at a higher rate when the mesh area was not smaller than 70 mm². By contrast, it was proved that, in expand grids produced by the rotary method, the drop rate is about a half of that in expand grids produced by the reciprocal method, or the drop rate of an active material is remarkably reduced.

Example 7

Example 7 is an example of the third embodiment. In the example, the ratio of corrosion amounts of two kinds of grid wires 1b in the case where the longer grid wires 1b+ among the grid wires surrounding each mesh 1c in an expand grid was changed from 100% to 130% was investigated.

Plural sets of disk cutters in which all the ridges 5a of the disk cutters 5 shown in FIG. 14 have the same amount of protrusion, and those in which every second ridge 5a of the disk cutters 5 to have a larger amount of protrusion were produced. Disk cutter rolls 6 were assembled by using such disk cutter sets, respectively. The slits 1d were formed in the metal sheet 1 in the slit forming step by using each of the disk cutter rolls 6. The metal sheet was expanded in the expanding step to produce an expand grid. As a result, expand grids were produced in which, among the grid wires surrounding each mesh 1c, the length of the two longer grid wires 1b+ ranges from 100% to 130% of that of the two shorter grid wires 1b−. All the expand grids have the same dimensions of the length of 115 mm, the width of 137 mm, and the thickness of 0.9 mm. The meshes 1c were adjusted in size so that the weight of one expand grid is substantially constant even when the shapes of the meshes 1c are varied.

An active material was filled into all of the expand grids having the meshes 1c of different shapes. Thereafter, the grids were cured and dried to form positive plates. The positive plates, and negative plates which were produced by a conventional method were combined with separators which are configured mainly by microporous polyethylene to produce lead storage batteries of Type 55D23 (Japanese Industrial Standard JIS D 5301) for an automobile. A given amount of dilute sulfuric acid of a predetermined specific gravity was poured and formation was performed to complete the lead storage batteries. The lead storage batteries were subjected to an overcharge test in which the batteries were placed in a water tank of 60° C. and then charged by 4.8 A for 30 days. After the overcharge test was completed, the lead storage batteries were disassembled, and the positive plates were taken out. The positive plates were rinsed well under running water, and then dried in a gaseous phase of 50° C. for 48 hours. Thereafter, the positive plates were impregnated with an epoxy resin. The epoxy resin was cut, the cut surface was mirror-polished, and the size of the grid was measured under a stereoscopic microscope to obtain the amount of corrosion.

Table 1 below shows results of the tests.

TABLE 1

| Length rate of longer grid wire to shorter grid wire (%) | Ratio of amounts of corrosion (longer grid wire:shorter grid wire) | Remarks |
|---|---|---|
| 100% | 65:35 | Conventional example |
| 102% | 58:42 | Example |
| 106% | 54:46 | Example |
| 110% | 51:49 | Example |
| 115% | 43:57 | Example |
| 120% | 40:60 | Example |
| 130% | — | Failure |

As seen from Table 1 above, when the grid wires 1b− and 1b+ have the same length (the length ratio is 100%), the amounts of corrosion are 65:35 or the larger amount of corrosion is about two times the smaller one. By contrast, when the grid wires 1b+ are prolonged to attain the ratio of from 102% to 120%, the difference between the amounts of corrosion is reduced while the difference in the case of 110% is minimum. When corrosions of the grid wires 1b+ and 1b− proceed in different rates, the grid wires 1b which are precedently corroded are early subjected to a crack of corrosion. By contrast, in the case where there is no difference between the amounts of corrosion, corrosions proceed in a substantially same manner, and hence the longest life can be attained. In order to sufficiently enhance the lengthening of life, therefore, it is further preferable to set the length of the grid wires 1b+ to be in the range of from 106% to 115% so that the difference between the amounts of corrosion shown in Table 1 can be suppressed to 15% or less. In the case where the length of the grid wires 1b+ is 130% or longer, however, an expand grid was not sufficiently expanded in the expanding step to produce a state in which the longer grid wires 1b+ are slackened, and hence the thickness of the grid was larger than a predetermined value. Therefore, such an expand grid was not subjected to the overcharge test.

In addition to the examples, similar tests were conducted while changing the dimensions of an expand grid, the size of the meshes 1c, the alloy composition of the metal sheet 1, the gravity of the electrolyte, etc. In all the tests, results which are substantially identical with those of the examples were obtained.

As apparent from the above description, according to the storage battery of the first embodiment of the invention, the widths of the grid wires of the expand grid are varied, whereby the corrosion resistance and productivity of a battery plate using the expand grid can be improved, so that the life performance of the storage battery can be enhanced.

According to the second embodiment, even in an expand grid which is produced from a thick metal sheet by the rotary method, nodes can be prevented from suffering a crack of corrosion by increasing the sectional area of the nodes. The expand grid is produced by the rotary method. Even when a thick metal sheet is used and the meshes are enlarged, therefore, an active material can be prevented from dropping off.

According to the third embodiment, the lengths of the four grid wires surrounding each mesh in an expand grid which is produced by the rotary method are varied, whereby corrosions are caused to proceed in a substantially uniform manner, so that the life performance of a storage battery in which the expand grid is used as a battery plate can be improved.

What is claimed is:

1. A storage battery comprising:
   a battery plate comprising an expanded grid member having one or more frame portions, a plurality of mesh openings, a plurality of nodes, and a plurality of grid wires extending between nodes;
   wherein the expanded grid member is formed from a metal sheet having multiple rows of slits extending intermittently at regular intervals along a first direction, the slits from adjacent rows being offset to create a zigzag relation of slits among the multiple rows, the metal sheet being expanded in a direction other than the first direction to form the expanded grid member, each slit of the metal sheet corresponding to a mesh opening among said plurality of mesh openings in the expanded grid member;
   wherein in the expanded grid member each mesh opening is bordered by a subset of the plurality of nodes and a subset of the plurality of grid wires, each one of said plurality of nodes formed by an uninterrupted portion of the metal sheet that extends between a slit in one row and a correspondingly aligned slit in a row not directly adjacent said one row, each one of said plurality of grid wires formed by a portion of the metal sheet that extends between a slit in one row and a neighboring slit in a row directly adjacent said one row;
   wherein each one node of said plurality of nodes has a sectional area in a plane of the expanded grid member that is perpendicular to a face of the expanded grid member and extends along a length of said one node, and each one grid wire of said plurality of grid wires has a sectional area in another plane of the expanded grid member that is perpendicular to the face and extends orthogonal to a length of said one grid wire;
   wherein the sectional area for any given node is at least two times the sectional area of any of the grid wires coupled to said given node, and
   wherein the sectional area for each one grid wire of said plurality of grid wires is not less than 1.0 mm$^2$ and not greater than 3.5 mm$^2$.

2. The storage battery of claim 1, wherein each mesh opening that is not bordered by a frame portion has an area of at least 70 mm$^2$.

3. The storage battery of claim 1, wherein the expanded grid member has a collector frame portion and a lower frame portion;
   wherein said plurality of mesh openings occur between said collector frame portion and said lower frame portion;
   wherein said plurality of grid wires comprise a first row of grid wires nearest said collector frame portion, a second row of grid wires nearest said lower frame portion, and intermediate rows of grid wires between said first row and said second row; and
   wherein widths of grid wires in the first row and second row are greater than widths of grid wires among multiple rows of said intermediate rows.

* * * * *

UNITED STATES PATENT AND TRADEMARK OFFICE
CERTIFICATE OF CORRECTION

PATENT NO. : 8,039,153 B2
APPLICATION NO. : 12/953040
DATED : October 18, 2011
INVENTOR(S) : Yoshiomi Fujiwara et al.

It is certified that error appears in the above-identified patent and that said Letters Patent is hereby corrected as shown below:

Title page correct the name of the Assignee as follows:

from: (73) "GS Yhasa International, Ltd., Kyoto (JP)"

to: (73) --GS Yuasa International, Ltd., Kyoto (JP)--

Signed and Sealed this
Eleventh Day of September, 2012

David J. Kappos
*Director of the United States Patent and Trademark Office*